United States Patent
Nalci et al.

(10) Patent No.: US 12,395,641 B2
(45) Date of Patent: Aug. 19, 2025

(54) HYBRID NEURAL NETWORK BASED END-TO-END IMAGE AND VIDEO CODING METHOD

(71) Applicant: APPLE INC., Cupertino, CA (US)

(72) Inventors: Alican Nalci, Cupertino, CA (US); Alexandros Tourapis, Los Gatos, CA (US); Hsi-Jung Wu, San Jose, CA (US); Jiefu Zhai, Sunnyvale, CA (US); Jingteng Xue, Cupertino, CA (US); Jun Xin, San Jose, CA (US); Mei Guo, San Jose, CA (US); Xingyu Zhang, Cupertino, CA (US); Yeqing Wu, Cupertino, CA (US); Yunfei Zheng, Santa Clara, CA (US); Jean Begaint, Cupertino, CA (US)

(*) Notice: Subject to any disclaimer, the term of this patent is extended or adjusted under 35 U.S.C. 154(b) by 281 days.

(21) Appl. No.: 17/951,919

(22) Filed: Sep. 23, 2022

(65) Prior Publication Data
US 2023/0096567 A1   Mar. 30, 2023

Related U.S. Application Data

(60) Provisional application No. 63/248,127, filed on Sep. 24, 2021.

(51) Int. Cl.
*H04N 19/147* (2014.01)
*H04N 19/119* (2014.01)
(Continued)

(52) U.S. Cl.
CPC ......... *H04N 19/147* (2014.11); *H04N 19/119* (2014.11); *H04N 19/124* (2014.11);
(Continued)

(58) Field of Classification Search
CPC .. H04N 19/147; H04N 19/119; H04N 19/124; H04N 19/172; H04N 19/176;
(Continued)

(56) References Cited

U.S. PATENT DOCUMENTS

2022/0398455 A1* 12/2022 Dumas ................ H04N 19/436
2023/0239516 A1*  7/2023 Mao ....................... H04N 19/30
                                                                375/240.12

FOREIGN PATENT DOCUMENTS

WO   WO 2021/165018 A1   8/2021

OTHER PUBLICATIONS

International Patent Application No. PCT/US2022/044575; Int'l Search Report and the Written Opinion; dated Mar. 17, 2023; 19 pages.

(Continued)

*Primary Examiner* — Jae N Noh

(57) ABSTRACT

Improved neural-network-based image and video coding techniques are presented, including hybrid techniques that include both tools of a host codec and neural-network-based tools. In these improved techniques, the host coding tools may include conventional video coding standards such as H.266 (VVC). In an aspects, source frames may be partitioned and either host or neural-network-based tools may be selected per partition. Coding parameter decisions for a partition may be constrained based on the partitioning and coding tool selection. Rate control for host and neural network tools may be combined. Multi-stage processing of neural network output may use a checkerboard prediction pattern.

31 Claims, 27 Drawing Sheets

(51) Int. Cl.
  *H04N 19/124* (2014.01)
  *H04N 19/172* (2014.01)
  *H04N 19/176* (2014.01)
  *H04N 19/186* (2014.01)
  *H04N 19/42* (2014.01)
  *H04N 19/60* (2014.01)
  *H04N 19/70* (2014.01)
  *H04N 19/91* (2014.01)

(52) U.S. Cl.
  CPC ......... *H04N 19/172* (2014.11); *H04N 19/176* (2014.11); *H04N 19/186* (2014.11); *H04N 19/42* (2014.11); *H04N 19/60* (2014.11); *H04N 19/70* (2014.11); *H04N 19/91* (2014.11)

(58) Field of Classification Search
  CPC ...... H04N 19/186; H04N 19/42; H04N 19/60; H04N 19/70; H04N 19/91
  See application file for complete search history.

(56) References Cited

OTHER PUBLICATIONS

Li et al; "Neural-Network-Based Cross-Channel Intra Prediction"; ACM Transactions on Multimedia Computing, Communications and Applications; vol. 17; 2021; 23 pages (abstract only).

Dumas et al.; "AHG11: Neural Network-based intra prediction with transform selection in VVC"; Joint Video Experts Team; Document: JVET-T0073; Oct. 2020; 11 pages.

Vivienne Sze et al.; "Entropy Coding in HEVC"; High Efficiency Video Coding (HEVC); 2014; p. 209-274.

Chen et al.; "Algorithm description for Versatile Video Coding and Test Model 12 (VTM 12)"; Document JVET-U2002-v1; Jan. 6-15, 2021; 103 pages.

Balle et al.; "Variational image compression with a scale hyperprior"; Image and Video Processing; arXiv:1802.01436; May 2018; 23 pages.

Lu et al.; "DVC: An End-to-End Deep Video Compression Framework"; IEEE/CVF Conf. on Computer Vision and Pattern Recognition; 2019; p. 11006-11015.

He et al.; "Checkerboard Context Model for Efficient Learned Image Compression"; IEEE/CVF Conf. on Computer Vision and Pattern Recognition; 2021; p. 14771-14780.

Singh et al.; "DNNVC: A study of handling YUV420 input format for DNN-based video coding"; Document JVET-T0123; Oct. 7-16, 2020; 8 pages.

Minnen et al.; "Joint Autoregressive and Hierarchical Priors for Learned Image Compression"; 32 Conf. Advances in Neural Information Processing Systems 31; 2018; 10 pages.

International Patent Application No. PCT/US2022/044575; Int'l Preliminary Report on Patentability; dated Apr. 4, 2024; 21 pages.

\* cited by examiner

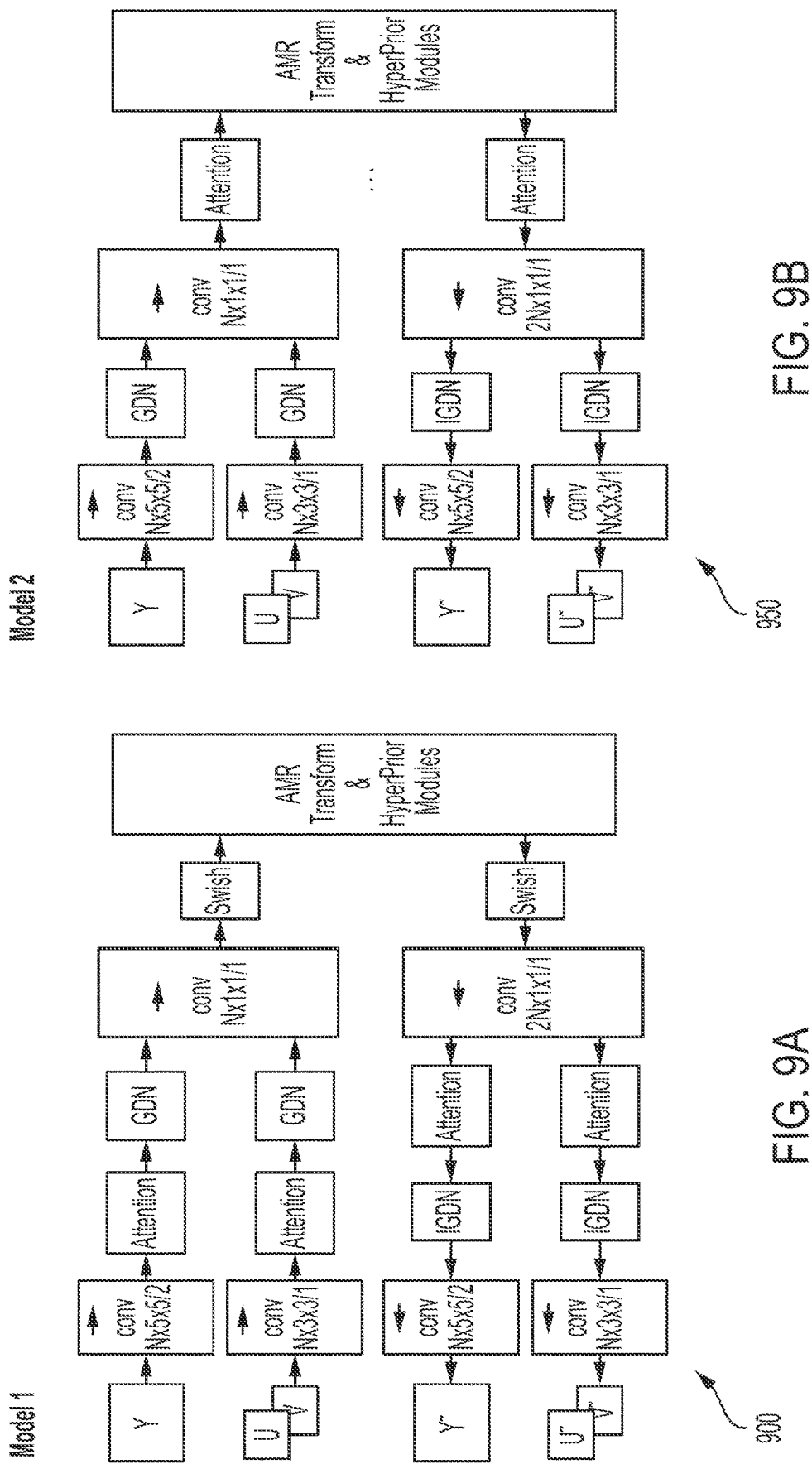

1320

1360

1300

1340

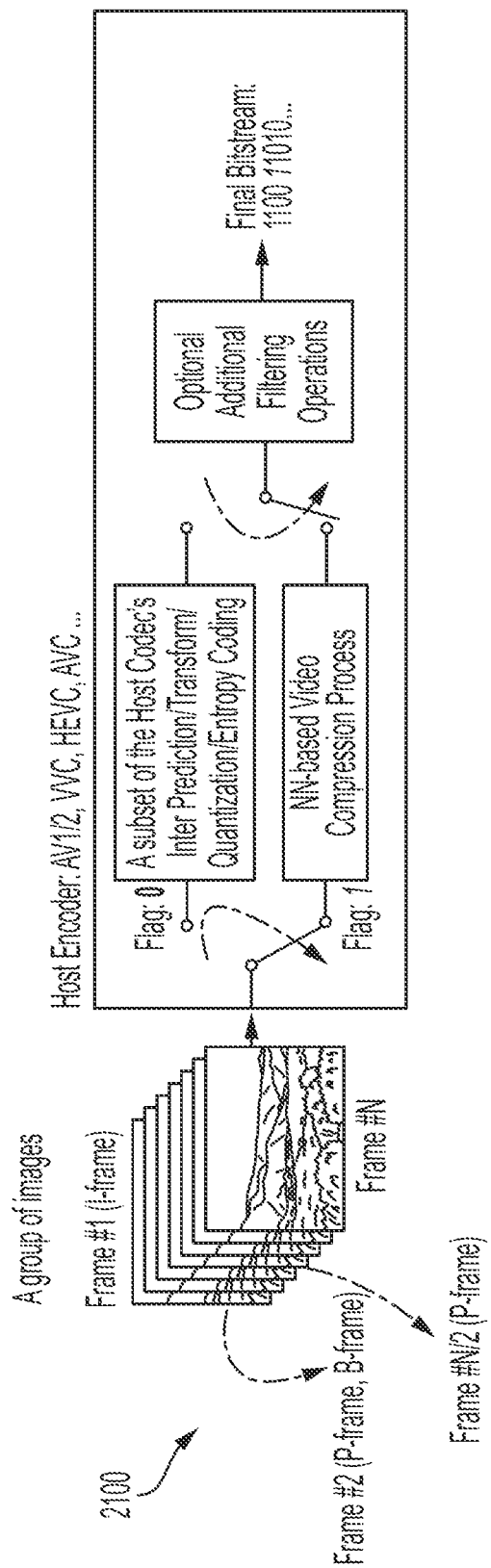
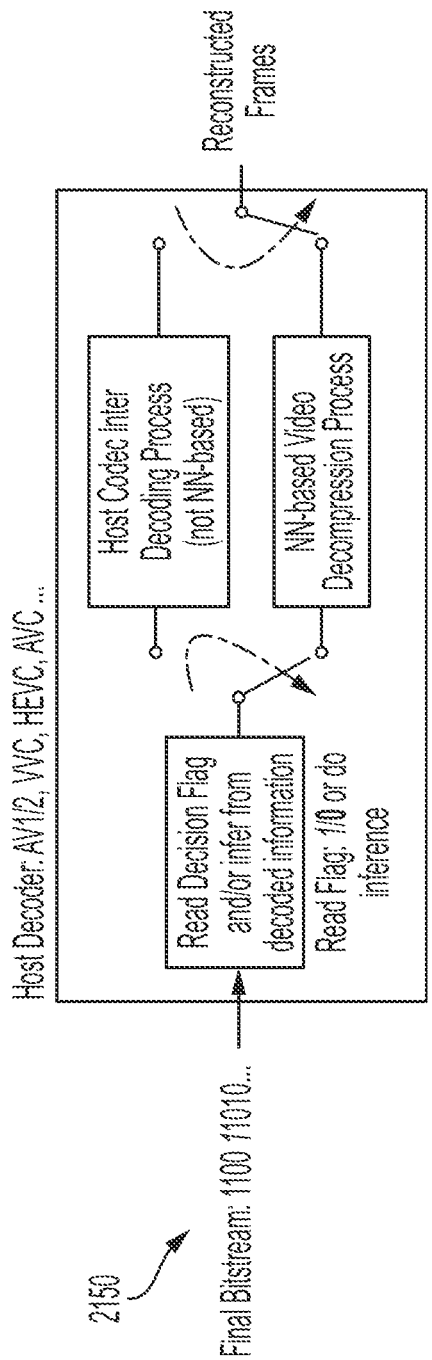
FIG. 21A
FIG. 21B

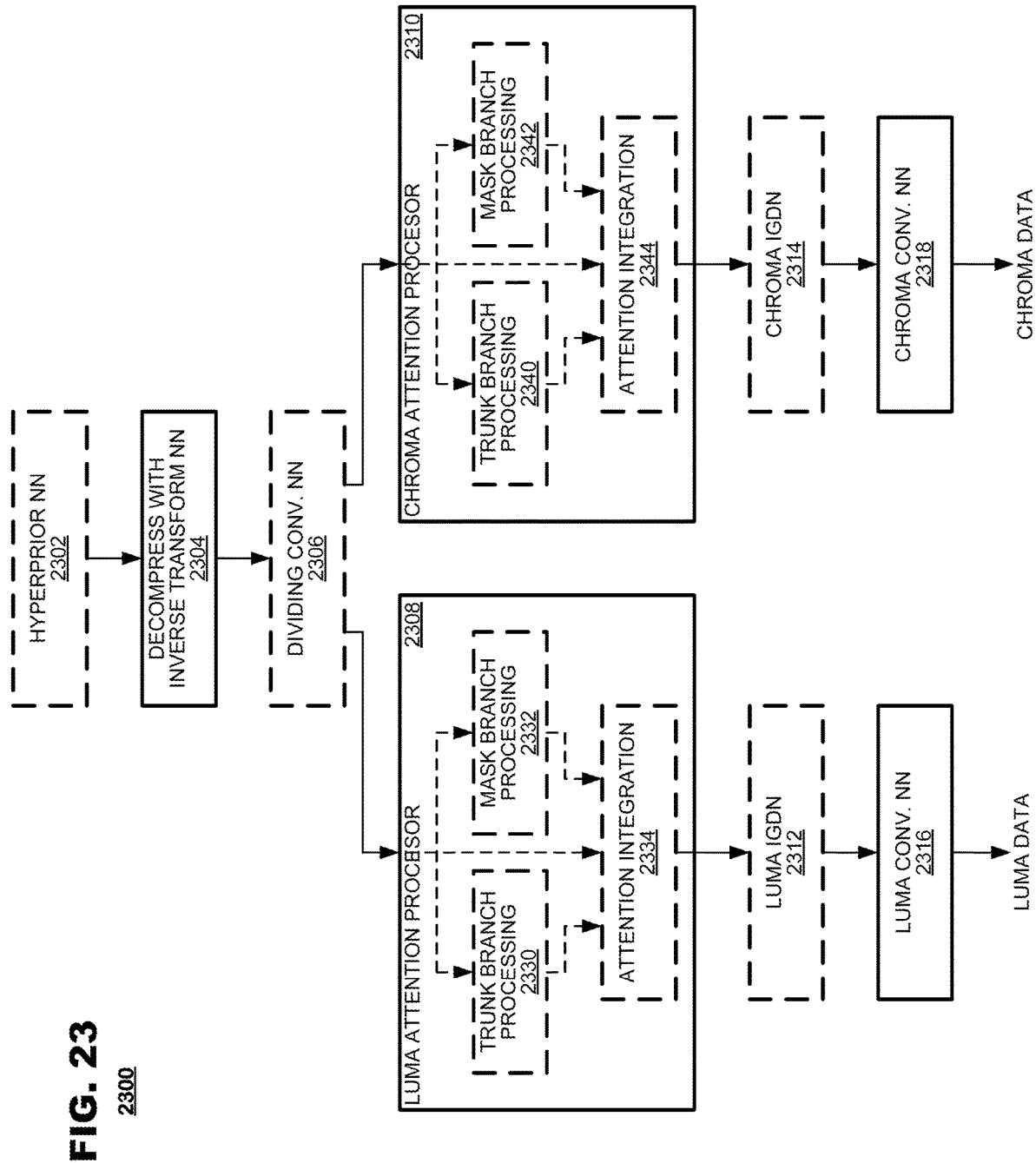

2400

2420

2440

HYBRID NEURAL NETWORK BASED END-TO-END IMAGE AND VIDEO CODING METHOD

PRIORITY

The disclosure claims the benefit under 35 U.S.C. § 119(e) of U.S. Provisional Patent Application No. 63/248,127 entitled "Hybrid Neural Network Based End-To-End Image And Video Coding Method," filed on Sep. 24, 2021, which is incorporated herein by reference in its entirety.

BACKGROUND

This disclosure relates to image and video coding with neural networks.

A conventional image/video codec consists of an encoder and decoder and compress image and video data for transmission and storage. Some examples of conventional video technologies are H.264 (AVC), H.265 (HEVC), H.266 (VVC), and AV1. Conventional codecs are usually block-based in which a source image or a video frame is partitioned into smaller image patches or regions called as coding blocks. This partitioning is a multi-stage process where a full image or video frame is split into coding-tree units (CTUs) or super-blocks. These super-blocks are usually greater than 64×64 pixels and can range up to 256×256 pixels or even larger. A super-block can then be further divided into smaller coding blocks (e.g., these can be as small as 4×4 pixels) for finer processing of the underlying data. An image or video encoder may select a set of compression or coding tools to compress the coding blocks or frames of an image based on rate-distortion costs.

Neural network (NN) based image and video compression show promising benefits in compressing digital images and video in an end-to-end fashion. Conventional image and video codecs such as HEVC (H.265), VVC (H.266) and AV1 can compress images and video data by relying on a collection of coding tools. NN based approaches are data-driven and, given enough training samples, could potentially outperform conventional compression systems with relatively minimal development effort.

BRIEF DESCRIPTION OF THE DRAWINGS

FIG. 9A depicts an example neural network encoder and decoder for separate luma/chroma processing and separate attention processors (Model 1 for luma/chroma).

FIG. 9B depicts an example neural network encoder and decoder for separate luma/chroma processing and combined attention processors (Model 2 for luma/chroma).

FIG. 21A depicts an example hybrid host and neural network encoding tools including neural network motion estimation/compensation.

FIG. 21B depicts an example hybrid host and neural network decoding tools including neural network motion estimation/compensation.

FIG. 23 depicts an example neural network decoding method with separate luma/chroma processing

DETAILED DESCRIPTION

Figure 1:
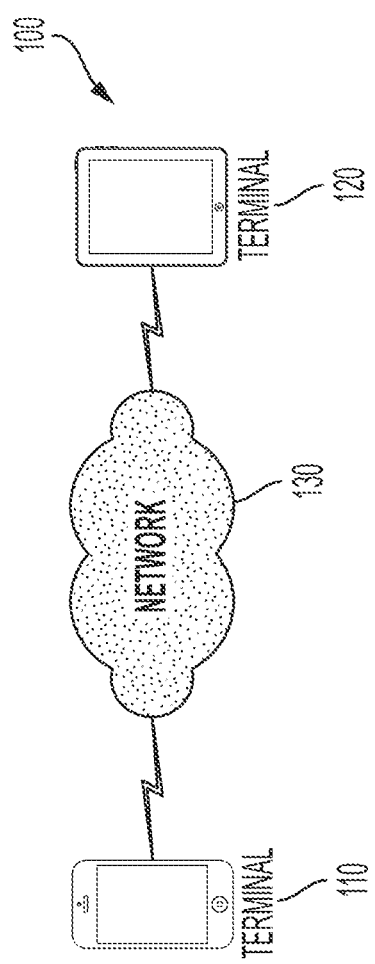
FIG. 1 depicts video coding system suitable for use with aspects of the present disclosure.

Improved image and video compression techniques are presented using neural networks (NN). These improved techniques include improvements to end-to-end neural network codecs, as well as hybrid codecs that combine a block-based encoder or decoder with one or more alternative neural network-based tools. A hybrid bitstream syntax may combine the block-based encoder's bitstream syntax with a bitstream portions output from the alternative neural network-based tools. Improvements to (non-hybrid) neural network-based compression techniques are also described, including a checkerboard pattern for multi-stage neural network encoding.

In an aspect of hybrid encoding, an image encoding method may include selecting an encoder for a portion of image data from either a first encoder or a neural network encoder based on a rate-distortion analysis. When the neural network encoder is selected, encoding the portion with the neural network encoder into a neural network encoded bitstream. Alternatively, when the first encoder is selected, encoding the portion with the first encoder into a first encoded bitstream. The data of the encoded portion may be included in an encoded bitstream with encoded data of other portion(s) of the image data. In one example, the first encoder encodes the first portions based on first portions' corresponding first encoding parameters, while the first portions' corresponding first encoding parameters are constrained based on the first portions' corresponding selection of an encoder. In another example, the encoder selections for corresponding portions of the image data are entropy coded with a probability model, and the packing of the combined bitstream includes packing entropy coded encoder selections into the combined bitstream.

In and aspect of hybrid decoding, an image decoding method, may include identifying, from encoded video data, selections of an encoder for corresponding portions of image data, and parsing the encoded video data into a first bitstream and a neural network bitstream based on the selections. When the first encoder is selected, decoding the portion with the first encoder into a first encoded bitstream into decoded first portions, and when a neural network decoder is selected, decoding the corresponding portion with the neural network decoder into decoded neural network portions. The decoded first portions and decoded neural network portions may be combined into reconstructed video data.

In an aspect of rate control for hybrid coding, an image coding method may include encoding first partitions of image data by a first encoder technique and according to coding parameters determined from a first rate control parameter, and encoding second partitions of the image data by a neural network encoder according to coding parameters determined from a neural network rate control parameter. The encoded data of the first partitions and the encoded data of the second partitions may be merged into a combined bitstream.

In an aspect of neural network encoding with a multi-stage encoding context, a neural network coding method may include transforming image data with a neural network to produce a latent representation two-dimensional array y. The array y may be encoded with a four-stage encoder including dividing the array y into four groups of y values, each group having y values substantially uniformly spatially distributed across the array y, and then encoding the groups in four stages. First encoding the first group as an anchor group without reference to the other groups; second encoding the second group based on a second context that depends on the encoded first group and does not depend on the third and fourth groups; third encoding the third group based on a third context that depends on the encoded first and second groups and does not depend on the fourth group; and fourth encoding the fourth group based on a fourth context that depends on the encoded first, second, and third groups.

In an aspect for neural network encoding with separate attention processor for luma and chroma color components, a neural network coding method may include processing luma image data with a luma preprocessor including luma convolutional neural network configured with an output attached to the input of a luma attention processor, and processing chroma image data with a chroma preprocessor including chroma convolutional neural network configured with an output attached to the input of a chroma attention processor. The preprocessed luma and chroma image data may then be compressed with a primary transform neural network.

FIG. 1 depicts video coding system 100 suitable for use with aspects of the present disclosure. The system 100 may include a plurality of terminals 110, 120 interconnected via a network 130. The terminals 110, 120 may code video data for transmission to their counterparts via the network 130. Thus, a first terminal 110 may capture video data locally, code the video data and transmit the coded video data to the counterpart terminal 120 via the network 130. The receiving terminal 120 may receive the coded video data, decode it, and render it locally, for example, on a display at the terminal 120. If the terminals are engaged in bidirectional exchange of video data, then the terminal 120 may capture video data locally, code the video data and transmit the coded video data to the counterpart terminal 110 via the network 130. The receiving terminal 110 may receive the coded video data transmitted from terminal 120, decode it, and render it locally, for example, on its own display. The processes described can operate on both frame and field frame coding but, for simplicity, the present discussion will describe the techniques in the context of integral frames.

A video coding system 100 may be used in a variety of applications. In a first application, the terminals 110, 120 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 120). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1, the terminals 110, 120 are illustrated as a smart phone and a tablet computer, respectively, but the principles of the present disclosure are not so limited. Aspects of the present disclosure also find application with various types of computers (desktop, laptop, and tablet computers), computer servers, media players, dedicated video conferencing equipment and/or dedicated video encoding equipment.

The network 130 represents any number of networks that convey coded video data between the terminals 110, 120, including for example wireline and/or wireless communication networks. The communication network 130 may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

Figure 2:
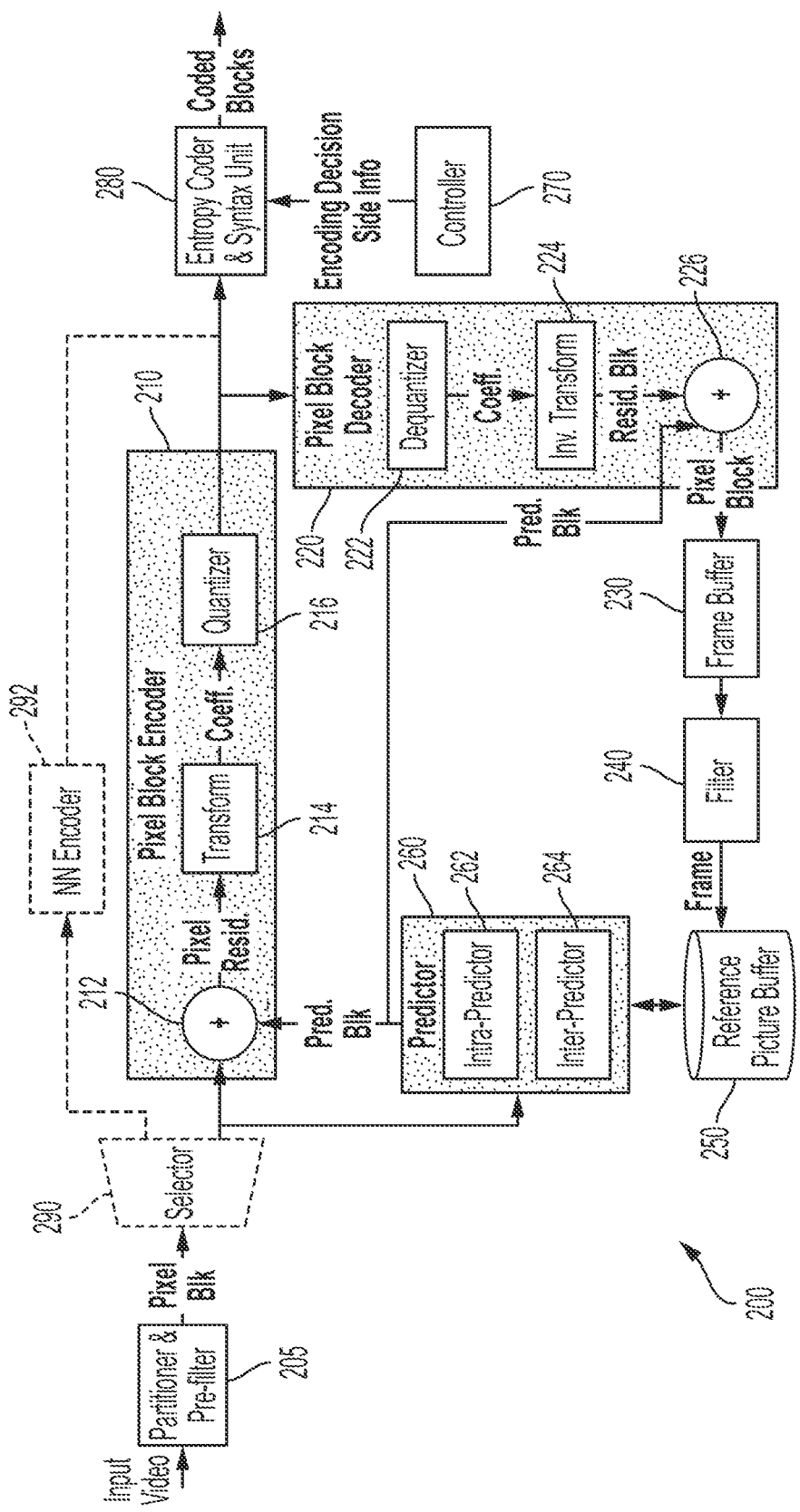
FIG. 2 depicts an example block-based encoder.

FIG. 2 depicts an example block-based encoder system 200 according to an aspect of the present disclosure. The system 200 may include a partitioner and pre-filter 205, a pixel block coder 210, a pixel block decoder 220, a frame buffer 230, an in-loop filter system 240, reference picture buffer 250, a predictor 260, a controller 270, and an entropy coder and syntax unit 280. The encoding system 200 may operate on predetermined units of video frames, called "pixel blocks" for convenience, to code the pixel blocks differentially according to predictive techniques. Thus, a frame of video to be coded may be parsed into pixel blocks, which the pixel block encoder 210 processes on a pixel block-by-pixel block basis. The partitioner and pre-filter 205 may partition source frames spatially into pixel blocks and may apply any pre-filtering to the input frames or individual partitioned pixel blocks. The pixel block coder 210 may present coded pixel block data to the entropy coder and syntax unit 280, which may entropy code the coded pixel block data, and coding parameters and decisions as side information in the result according to a transmission syntax that conforms to a governing coding protocol.

The pixel block decoder 220 may decode the coded pixel block data, generating decoded pixel block data therefrom. The frame buffer 230 may generate reconstructed frame data from the decoded pixel block data. The in-loop filter 240 may perform one or more filtering operations on the reconstructed frame. For example, the in-loop filter 240 may perform deblocking filtering, sample adaptive offset (SAO) filtering, adaptive loop filtering (ALF), maximum likelihood (ML) based filtering schemes, deringing, debanding, sharpening, resolution scaling, and the like. The reference picture buffer 260 may store the filtered frame, where it may be used as a source of prediction of later-received pixel blocks. The entropy coder 280 may reduce bandwidth of the output of the coefficient quantizer by coding the output, for example, by variable length code words or using a context adaptive binary arithmetic coder.

The pixel block coder 210 may include a subtractor 212, a transform unit 214, and a quantizer 216. The pixel block coder 210 may accept pixel blocks of input data at the subtractor 212. The subtractor 212 may receive predicted pixel blocks from the predictor 260 and generate an array of pixel residuals therefrom representing a difference between the input pixel block and the predicted pixel block. The transform unit 214 may apply a transform to the sample data output from the subtractor 212, to convert data from the pixel domain to a domain of transform coefficients. In some scenarios (for example, when operating in high dynamic range) prior to transform unit 214 and/or subtractor 212, the input may be reshaped, or an adaptation scheme be applied to adjust to the content transfer characteristics. Such an adaption can be either a simple scaling, based on a re-mapping function, or a more sophisticated pixel manipulation technique. The quantizer 216 may perform quantization of transform coefficients output by the transform unit 214 according to a quantization parameter Qp. The quantizer 216 may apply either uniform or non-uniform quantization parameters; non-uniform quantization parameters may vary across predetermined locations of the block of coefficients output from the transform unit 214.

The transform unit 214 may operate in a variety of transform modes as determined by the controller 270. For example, the transform unit 214 may apply a discrete cosine transform (DCT), a discrete sine transform (DST), a Walsh-Hadamard transform, a Haar transform, a Daubechies wavelet transform, or the like. In an aspect, the controller 270 may select a coding mode to be applied by the transform unit 215, may configure the transform unit 215 accordingly and may signal the coding mode M in the coded video data, either expressly or impliedly.

The quantizer 216 may operate according to a quantization parameter Qp that may be determined by the controller 270. Techniques for developing the quantization parameter are discussed hereinbelow. The controller 270 may provide data to the syntax unit 280 representing its quantization parameter selections.

The pixel block decoder 220 may invert coding operations of the pixel block coder 210. For example, the pixel block decoder 220 may include a dequantizer 222, an inverse transform unit 224, and an adder 226. In some scenarios (for example, when operating in high dynamic range) post to inverse transform unit 224 and/or adder 226, the input may be inverse reshaped or re-mapped typically according to a function that was applied at the encoder and content characteristics. The pixel block decoder 220 may take its input data from an output of the quantizer 216. Although permissible, the pixel block decoder 220 need not perform entropy decoding of entropy-coded data since entropy coding is generally a lossless event. The dequantizer 222 may invert operations of the quantizer 216 of the pixel block coder 210. The dequantizer 222 may perform uniform or non-uniform de-quantization as specified by the quantization parameter data Qp. Similarly, the inverse transform unit 224 may invert operations of the transform unit 214. The dequantizer 222 and the inverse transform unit 224 may use the same quantization parameters Qp and transform modes as their counterparts in the pixel block coder 210. Quantization operations likely will truncate data in various respects and, therefore, data recovered by the dequantizer 222 likely will possess coding errors when compared to the data presented to the quantizer 216 in the pixel block coder 210.

The adder 226 may invert operations performed by the subtractor 212. It may receive the same prediction pixel block from the predictor 260 that the subtractor 212 used in generating residual signals. The adder 226 may add the prediction pixel block to reconstructed residual values output by the inverse transform unit 224 and may output reconstructed pixel block data.

As described, the frame buffer 230 may assemble a reconstructed frame from the output of the pixel block decoders 220. The in-loop filter 240 may perform various filtering operations on recovered pixel block data. For example, the in-loop filter 240 may include a deblocking filter, a sample adaptive offset ("SAO") filter, and/or other types of in loop filters (not shown).

The reference picture buffer 250 may store filtered frame data for use in later prediction of other pixel blocks. Different types of prediction data are made available to the predictor 260 for different prediction modes. For example, for an input pixel block, intra prediction takes a prediction reference from decoded data of the same frame in which the input pixel block is located. Thus, the reference frame store 250 may store decoded pixel block data of each frame as it is coded. For the same input pixel block, inter prediction may take a prediction reference from previously coded and decoded frame(s) that are designated as reference frames. Thus, the reference frame store 250 may store these decoded reference frames.

The predictor 260 may supply prediction blocks to the pixel block coder 210 for use in generating residuals. The predictor 260 may perform prediction search operations according to intra mode coding, and uni-predictive, bi-predictive, and/or multi-hypothesis inter mode coding. For intra mode coding, the predictor 260 may search from among pixel block data from the same frame as the pixel block being coded that provides a closest match to the input pixel block. For inter mode coding, the predictor 260 may search from among pixel block data of other previously coded frames stored in the reference picture buffer 250 that provides a match to the input pixel block. From among the predictions generated according to the various modes, the predictor 260 may select a mode that achieves the lowest distortion when video is decoded given a target bitrate. Exceptions may arise when coding modes are selected to satisfy other policies to which the encoding system 200 adheres, such as satisfying a particular channel behavior, or supporting random access or data refresh policies.

The controller 270 may control overall operation of the encoding system 200. The controller 270 may control partitioner & pre-filter 205 and may select operational parameters for the pixel block coder 210 and the predictor 260 based on analyses of input pixel blocks and also external constraints, such as a coding quality level or bitrate targets, and other operational parameters. As is relevant to the present discussion, when it selects quantization parameters Qp, the use of uniform or non-uniform quantizers, and/or the transform mode M, it may provide those parameters to the syntax unit 280, which may include data representing those parameters in the data stream of coded video data output by the encoding system 200. The controller 270 also may select between different modes of operation by which the system may generate reference images and may include metadata identifying the modes selected for each portion of coded data.

During operation, the controller 270 may revise operational parameters of the quantizer 216 and the transform unit 215 at different granularities of image data, either on a per pixel block basis or on a larger granularity (for example, per frame, per slice, per largest coding unit ("LCU") or Coding Tree Unit (CTU), or another region). In an aspect, the quantization parameters may be revised on a per-pixel basis within a coded frame.

Additionally, as discussed, the controller 270 may control operation of the in-loop filter 250 and the prediction unit 260. Such control may include, for the prediction unit 260, mode selection (lambda, modes to be tested, search windows, distortion strategies, etc.), and, for the in-loop filter 250, selection of filter parameters, reordering parameters, weighted prediction, etc.

Figure 8:
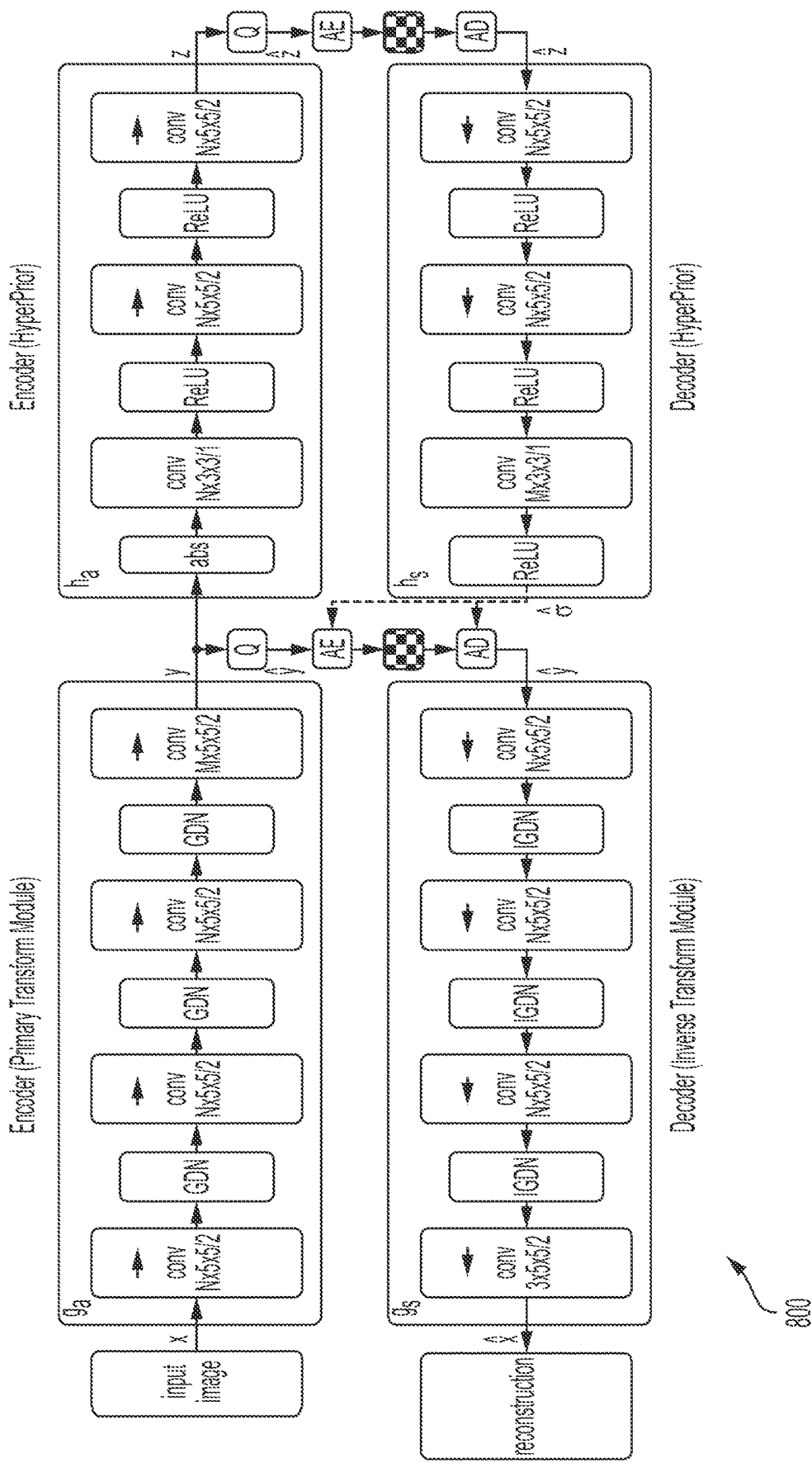
FIG. 8 depicts an example end-to-end neural network encoder and decoder with primary transform modules and hyper-prior modules.

In an optional aspect, encoder 200 may operate as a hybrid neural network encoder. A hybrid codec may include at least one first coding tool having a corresponding alternative coding tool. The corresponding tool alternatives may be first encoding tool and a neural network tool, where the first encoding tool does not include a neural network and the neural network coding tool either does include a neural network or may be designed to work with another neural network coding tool. The first encoder may act as a host to the neural network alternative tool. For example, an optional neural network encoder 292 may encode pixel blocks, for example using a convolutional neural network such as depicted in FIG. 8. An optional selector 290 may select between the host codec's pixel block encoder 210 or the alternative's neural network encoder 292. Controller 270 may select between these encoders, for example, on a per-pixel-block basis or per-superblock of pixel blocks. Controller 270 may include an indication of the encoder selections in the side information included in the encoded output of encoder system 200. In an alternate hybrid aspect, an encoder selector may be positioned after subtractor 212 such that the neural network encoder may encode residual blocks instead of source pixel blocks, as depicted in FIG. 2.

Figure 14A:
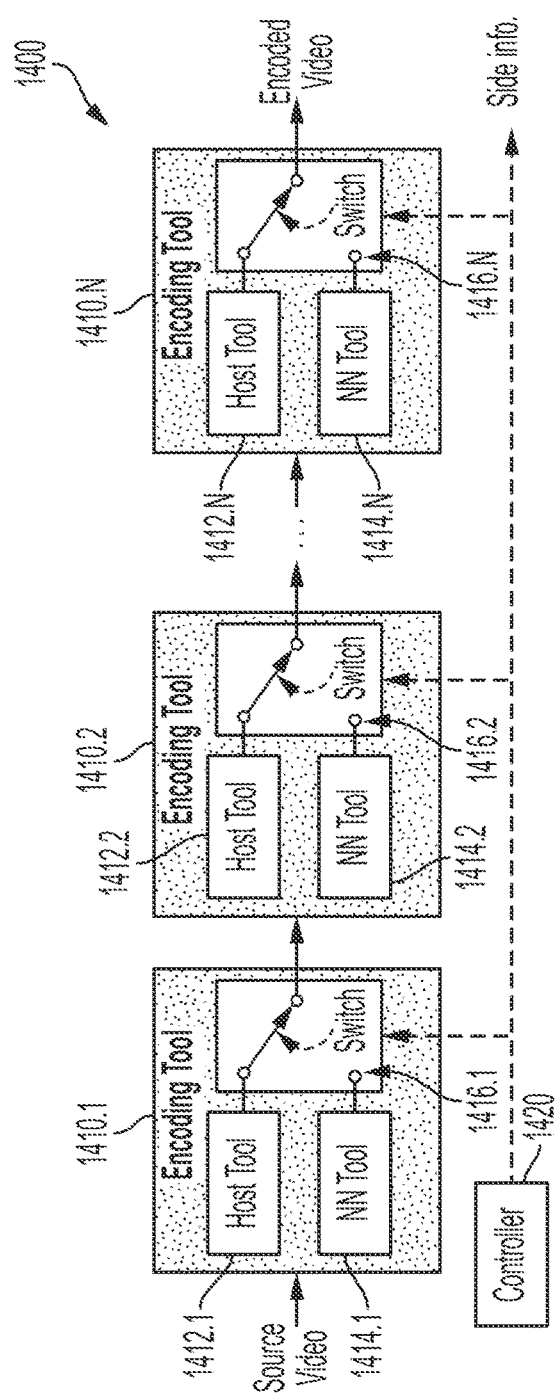
FIG. 14A depicts an example chain of hybrid host and neural network encoding tools.

In other aspects for hybrid encoding, any of the processing tools of encoder system 200 may optionally include alternate versions, such as a host codec version and a neural network-based version. Example coding tools with alternate versions may include the partitioner and pre-filter 205, pixel block coder 210, pixel block decoder 220, frame buffer 230, in loop filter system 240, reference picture buffer 250, predictor 260, and an entropy coder and syntax unit 280. Controller 270 may select between host tool and neural network tool for each hybrid tool, and an indication of the selections between these tools may be included as operational parameter side information in the coded output data. A cascade 1400 of such hybrid coding tools is depicted in FIG. 14A, where hybrid encoding tools 1410.1-1410.N each includes a switch 1416.x controlled by controller 1420 for selecting between host tools 1412.x and neural network tools 1414.x and may produce side information of the host/neural-network selections.

Figure 3:
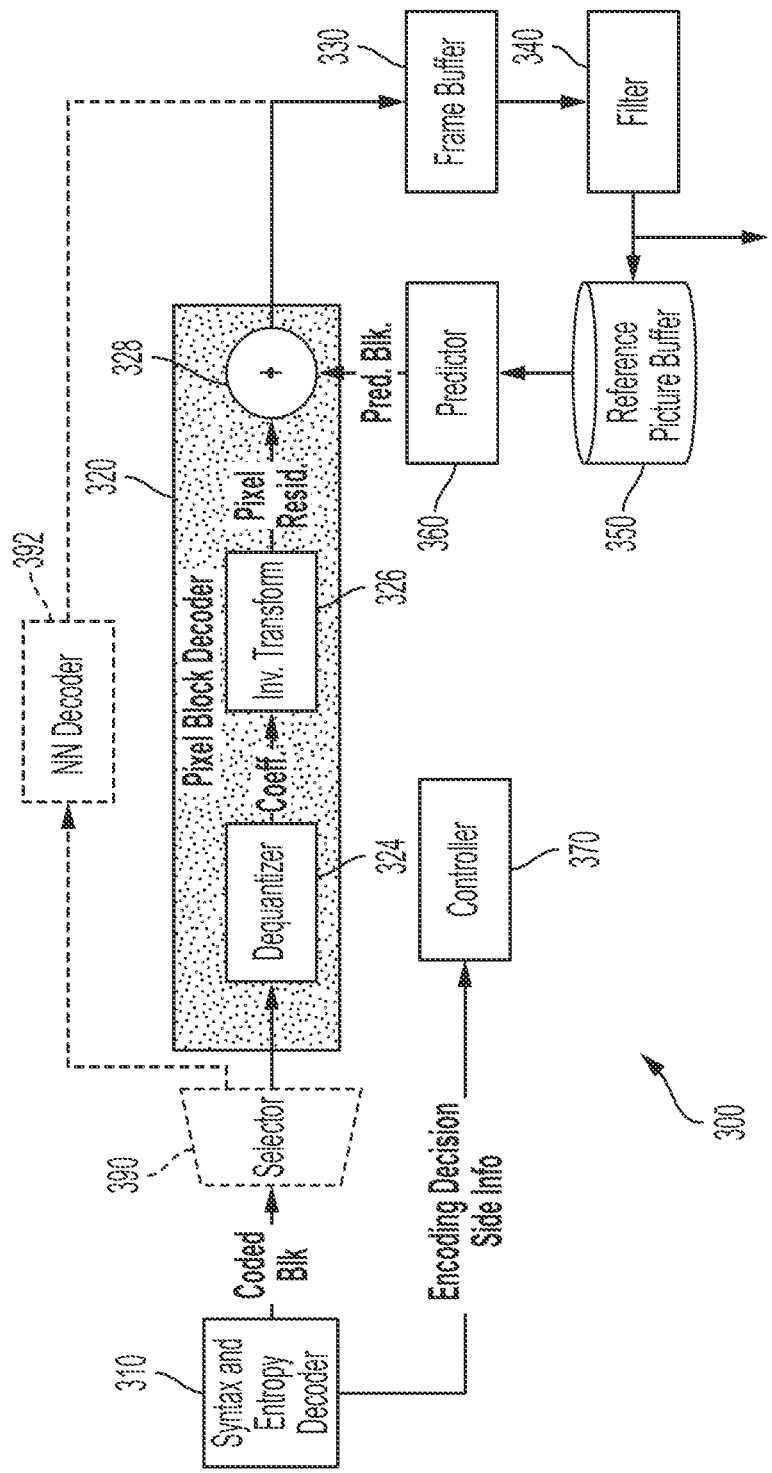
FIG. 3 depicts an example block-based decoder.

FIG. 3 depicts an example block-based decoder system 300 according to an aspect of the present disclosure. The decoding system 300 may include a syntax and entropy decoder 310, a pixel block decoder 320, a frame buffer 330, an in-loop filter 340, a reference picture buffer 350, a predictor 360, and a controller 370.

The syntax and entropy decoder 310 may receive a coded video data stream and may parse the coded data into its constituent parts. Encoding decision side information, including coding parameters, may be furnished to the controller 370, while data representing residuals (the data output by the pixel block coder 210 of FIG. 2) may be furnished to its respective pixel block decoder 320. The predictor 360 may generate a prediction block from reference data available in the reference picture buffer 350 according to coding parameter data provided in the coded video data. It may supply the prediction block to the pixel block decoder 320. The pixel block decoder 320 may invert coding operations applied by the pixel block coder 210 (FIG. 2). The frame buffer 330 may create a reconstructed frame from decoded pixel blocks output by the pixel block decoder 320. The in-loop filter 340 may filter the reconstructed frame data. The filtered frames may be output from the decoding system 300. Filtered frames that are designated to serve as reference frames also may be stored in the reference picture buffer 350.

The pixel block decoder 320 may include, a dequantizer 324, an inverse transform unit 326, and an adder 328. The entropy decoder 322 may perform entropy decoding to invert processes performed by the entropy coder 218 (FIG. 2). The dequantizer 324 may invert operations of the quantizer 316 of the pixel block coder 210 (FIG. 2). Similarly, the inverse transform unit 326 may invert operations of the transform unit 214 (FIG. 2). They may use the quantization parameters Qp and transform modes M that are identified from the coded video data stream. Because quantization is likely to truncate data, the pixel blocks recovered by the dequantizer 324, likely will possess coding errors when compared to the input pixel blocks s presented to the pixel block coder 210 of the encoder (FIG. 2).

The adder 328 may invert operations performed by the subtractor 210 (FIG. 2). It may receive a prediction pixel block from the predictor 360 as determined by prediction references in the coded video data stream. The adder 328 may add the prediction pixel block to reconstructed residual values output by the inverse transform unit 326 and may output reconstructed pixel block data.

As described, the frame buffer 330 may assemble a reconstructed frame from the output of the pixel block decoder 320. The in-loop filter 340 may perform various filtering operations on recovered pixel block data as identified by the coded video data. For example, the in-loop filter 340 may include a deblocking filter, a sample adaptive offset ("SAO") filter, and/or other types of in loop filters. In this manner, operation of the frame buffer 330 and the in-loop filter 340 mimic operation of the counterpart frame buffer 230 and in loop filter 240 of the encoder 200 (FIG. 2).

The reference picture buffer 350 may store filtered frame data for use in later prediction of other pixel blocks. The reference picture buffer 350 may store decoded frames as it is coded for use in intra prediction. The reference picture buffer 350 also may store decoded reference frames.

As discussed, the predictor 360 may supply the prediction blocks to the pixel block decoder 320 according to a coding mode identified in the coded video data. The predictor 360 may supply predicted pixel block data as determined by the prediction reference indicators supplied in the coded video data stream.

The controller 370 may control overall operation of the decoding system 300. The controller 370 may set operational parameters for the pixel block decoder 320 and the predictor 360 based on parameters received in the coded video data stream. As is relevant to the present discussion, these operational parameters may include quantization parameters Qp for the dequantizer 324 and transform modes M for the inverse transform unit 310. As discussed, the received parameters may be set at various granularities of image data, for example, on a per pixel block basis, a per frame basis, a per slice basis, a per LCU/CTU basis, or based on other types of regions defined for the input image.

In an optional aspect, decoder system 300 may operate as a hybrid neural network decoder. The host decoder may act as a host to one or more neural network alternative decoding tool(s). For example, a neural network encoder 392 may decode pixel blocks, for example using a convolutional neural network such as depicted in the bottom half of FIG. 8 for synthesis (including neural networks $g_s$ and $h_s$). A selector 390 may select between the host codec tool pixel block decoder 320 or neural network decoder 392. Controller 370 may select between these encoders based on side information extracted from an encoded bitstream, for example, on a per-pixel-block basis or per-superblock of pixel blocks. In an alternate hybrid aspect, the neural network decoder may decode residual block and the output of the neural network decoder may in coupled to an input of the adder 328 (instead of at the output of adder 328 as depicted in FIG. 3).

Figure 14B:
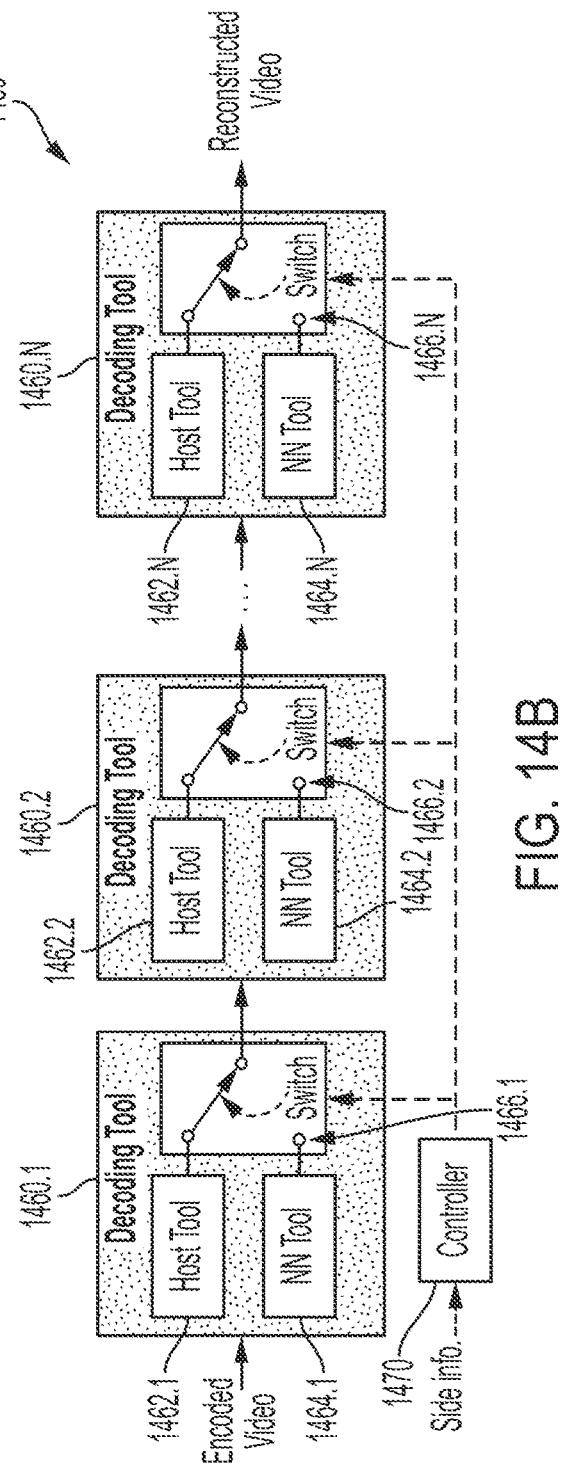
FIG. 14B depicts an example chain of hybrid host and neural network decoding tools.

In other aspects for hybrid decoding, any of the processing tools of decoder system 300 may optionally include alternate versions, such as a host codec version and a neural network-based version. Example coding tools with alternate versions may include syntax and entropy decoder 310, dequantizer 324, inversion transform 326, predictor 360, and filter 340. Controller 370 may select between host tool and neural network tool for each hybrid tool, such as based on side information included in the encoded video. A cascade 1450 of such hybrid decoding tools is depicted in FIG. 14B, where hybrid encoding tools 1460.1-1460.N each includes a switch 1466.x controlled by controller 1470 for selecting between host tools 1462.x and neural network tools 1464.x. Cascade 1450 of decoding tools in FIG. 14A may be a complement to cascade 1400 of encoding tools in FIG. 14B.

In an aspect, a first codec may act as a host codec in a hybrid system in that a hybrid codec may be created by starting with the first codec and modifying it to add alternative coding tools. A preexisting encoder and/or decoder using the first codec may be modified by the addition of alternative codec tools, where the alternative tools act as a substitute for one or more of the preexisting codec tools for certain portion(s) of image data. For example, H.264 specifies a set of codec tools similar to those depicted without dashed lines in FIGS. 2 and 3, hence these codec tools may act as a host encoder and/or decoder. Such an H.264 host encoder or decoder may be modified by adding alternative codec tools that each operate as a substitute for one or more of the H.264 codec tools in either an encoder or decoder. As depicted in FIG. 2, neural network encoder 292 (depicted in dashed lines) may operate as an alternative to pixel block encoder 210, and in FIG. 3, neural network decoder 392 (also in dashed lines) may act as an alternative to pixel block decoder 320. Such hybrid encoders and decoders may operate on portions of source image data, for example, where selection of host or alternative codec tools may occur for each separate portion of image data, such as a groups of frame, a single complete frame, a color component (a luma or chroma channel), or a spatial partition of a single frame such as a pixel block or superblock.

In another aspect, a first codec may act as a host codec in that the host codec defines a bitstream syntax framework within which portions of an alternative encoded bitstream are encapsulated to create a new hybrid bitstream syntax. For example, as in FIG. 2, the entropy coder & syntax unit 280 may include an output stream from an alternative coding tool within the host's bitstream syntax that was previously defined for the non-hybrid host codec. The host bitstream syntax may be an encoded syntax that conforms to the H.264 standard, and the hybrid bitstream syntax maybe a modification of the H.264 syntax to allow insertion of encoded streams output from an alternative coding tool such as the neural network encoder 292.

Figure 4A:
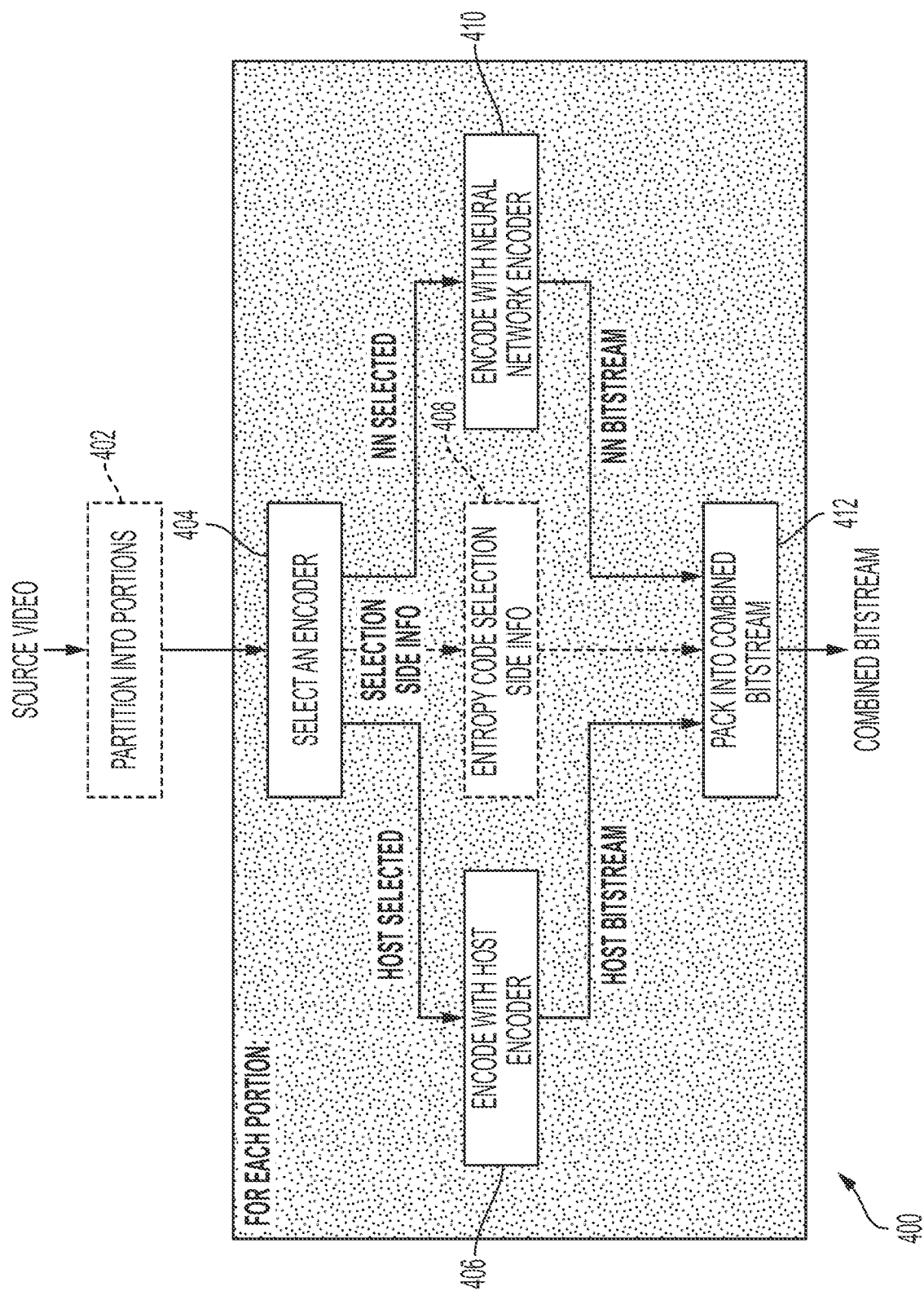
FIG. 4A depicts an example hybrid encoding method with encoder selection.

FIG. 4A depicts an example hybrid encoding method 400 with encoder selection. Method 400 may be implemented, for example, with the encoders of FIG. 2, 15A or 16A. For each portion of source video, an encoder is selected (box 404) between a first encoder and an alternative encoder, such as between a host encoder and a neural network-based encoder. When the host encoder is selected for a portion of source video, that portion is encoded by the host encoder (406) to produce a host encoded bitstream, and when the neural network-based encoder is selected for the portion of source video, the portion is encoded by the neural network-based encoder (410) to produce a neural network-based bitstream. Portions encoded in both the host bitstream and neural network bitstream may be combined into a combined bitstream (412), for example by syntax and entropy coder 280 of FIG. 2 or another type of bitstream packing unit.

In an aspect, a source video may be spatially partitioned into portions (402). In another aspect, selection side information indicating the encoder selection for a corresponding portion may be entropy coded (408) and included in the combined bitstream. Additional aspects of hybrid encoding are described below in Section 3 for "Hybrid Coding."

Figure 4B:
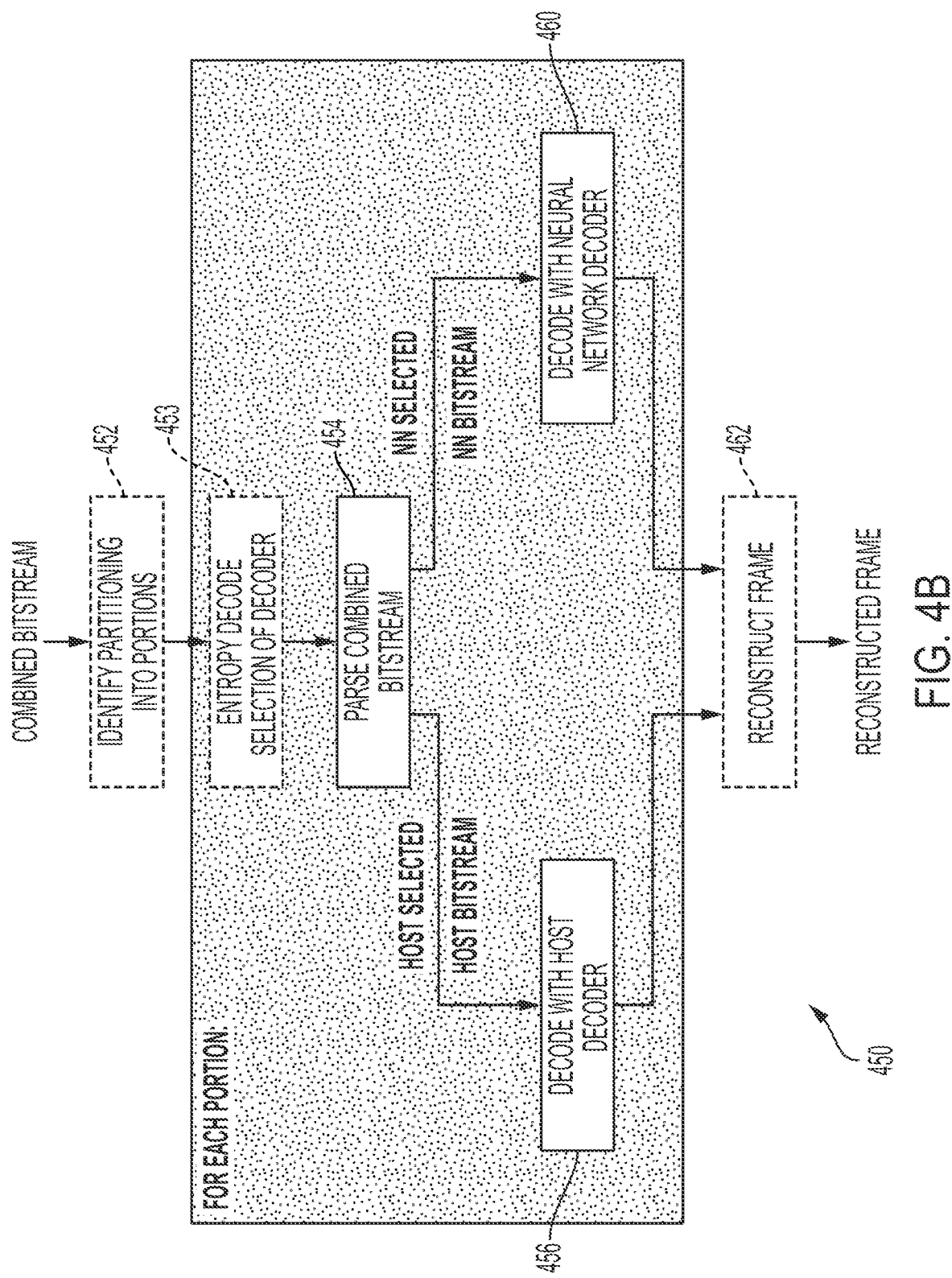
FIG. 4B depicts an example hybrid decoding method with decoder selection.

FIG. 4B depicts an example hybrid decoding method 450 with decoder selection, and in aspects may be a complement to encoding method 400 of FIG. 4A. Method 450 may be implemented, for example, with the decoders of FIG. 3, 15B or 16B. A combined bitstream may include portions of a source video encoded with either a first or alternative encoder, such as a host encoder or neural network-based encoder. The combined bitstream may be parsed (box 454) into a host bitstream of portions encoded by the host encoder and a neural network bitstream of portions encoded by the neural network-based encoder. When a portion was encoded with a host encoder, the corresponding portion of the host bitstream may be decoded with the host encoder (456), and when a portion was encoded with a neural network-based encoder, the corresponding portion of the neural network bitstream may be decoded with the neural network decoder (460).

In an aspect, a spatially partitioning of images into the portions may be identified from the combined bitstream (optional box 452). In another aspect, a selection of encoders for corresponding portions may be identified at a decoder by entropy decoding the selections from the combined bitstream (optional box 463). A decoded frame may be reconstructed (optional box 462) by combining portions decoded by the host and neural network decoders. Additional aspects of hybrid decoding are described below in Section 3 for "Hybrid Coding."

Figure 5:
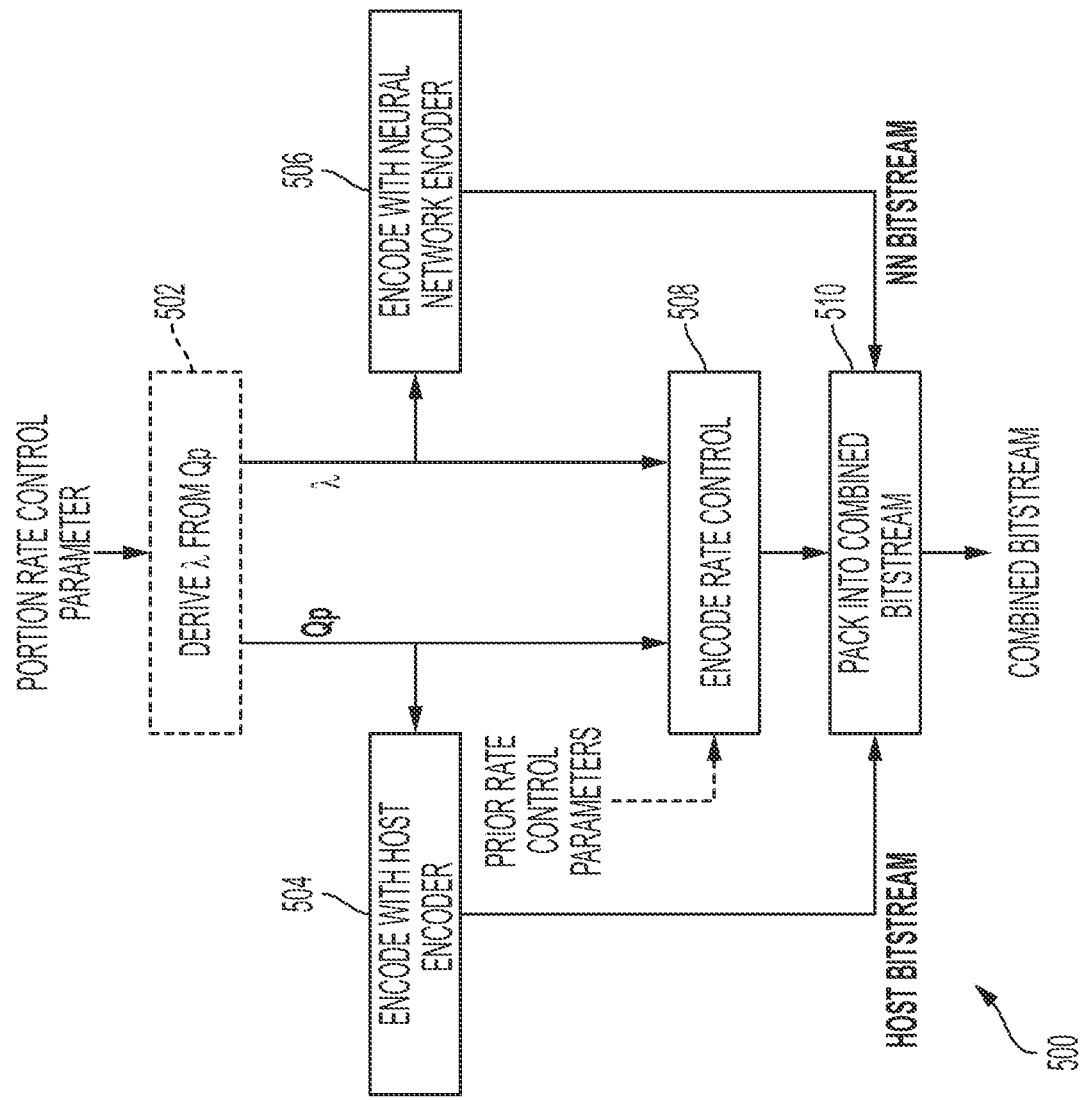
FIG. 5 depicts an example hybrid encoding method with rate control.

FIG. 5 depicts an example hybrid encoding method 500 with rate control. Method 500 may be implemented, for example, with the encoders of FIG. 2, 15A or 16A. First portions of video may be encoded with a host encoder (box 504) according to corresponding host rate control parameters (such as Qp) into a host bitstream, while second portions of video may be encoded with a neural network-based encoder (506) according to corresponding neural network rate control parameters (such as λ) into a neural network bitstream. The rate control parameters Qp and λ may be encoded (508) and the host bitstream and neural network bitstreams may be combined along with the encoded rate control parameters (510) into a combined bitstream.

In as aspect, the host rate control parameters and neural network rate control parameters may be derived from a general portion rate control parameter (optional box 502). Additional aspects of hybrid decoding are described below in Section 3.4 for "Rate Control of a Hybrid Codec."

Figure 6:
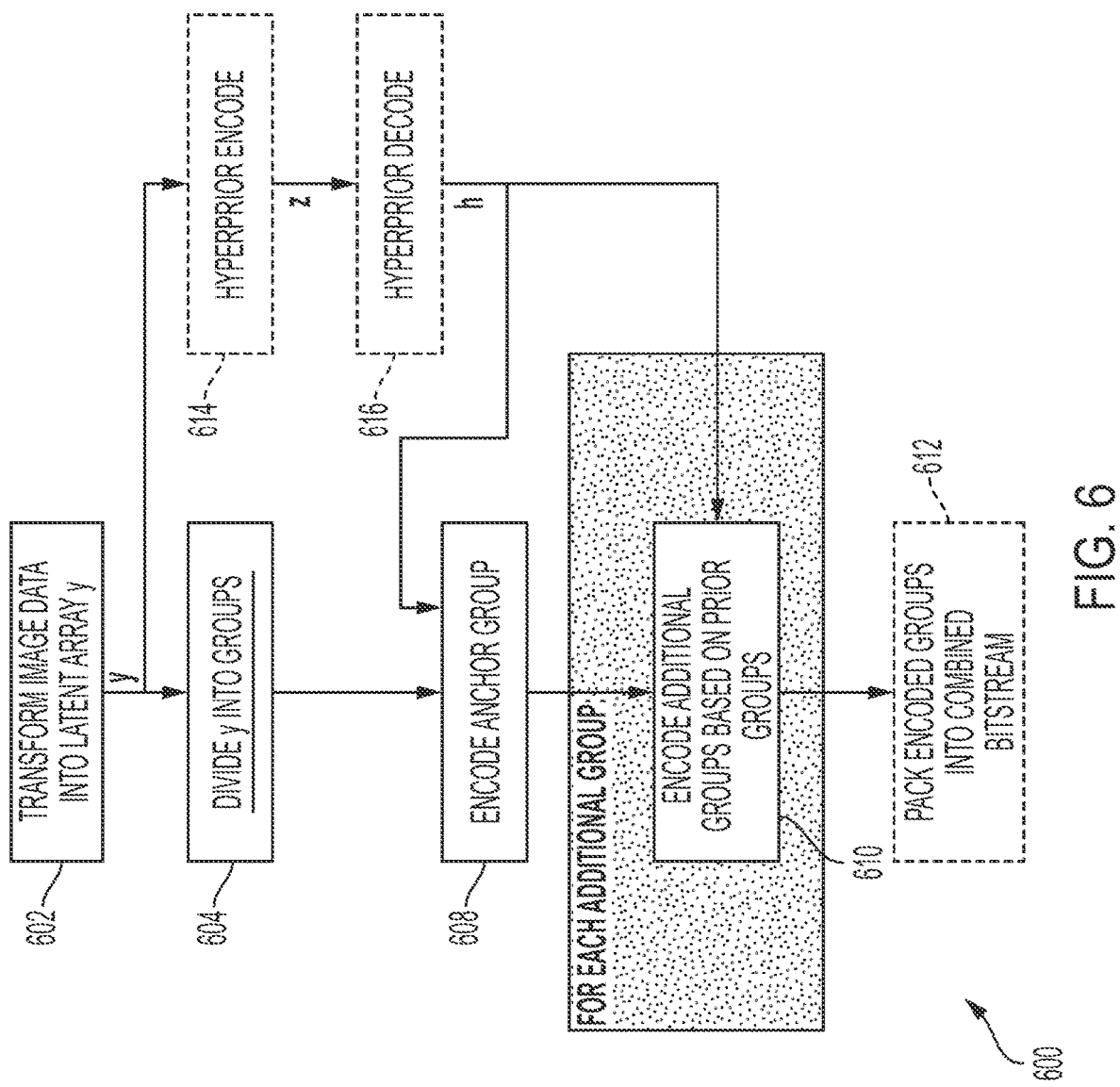
FIG. 6 depicts an example neural network coding method with multi-stage encoding.

FIG. 6 depicts an example neural network coding method 600 with multi-stage encoding. Method 600 may be implemented, for example, with the encoders of FIG. 2, 15A or 16A. A portion of image data may be transformed with a neural network into a latent array (box 602), for example with the primary transform module $g_a$ of FIG. 8. The latent array may be divided into a predetermined number of groups (604). A first group of latent values may be encoded as an anchor group (608) without respect to the other groups of this portion of image data. And then other groups may be encoded causally such that each additional group may be encoded based on the previously encoded groups in this portion of image data (610).

In as aspect, the encoded groups may be packed into a combined bitstream for the portion of video data (optional box 612). In another aspect, the latent array may be further processed with a hyperprior encoder (optional box 614) to produce hyperprior side information z, which may then be processed with a hyperprior decoder (optional box 616), for example using the hyperprior encoder $h_a$ and decoder $h_s$ of FIG. 8. The encoding of the anchor group (608) and additional groups (610) may be based on the result output by the hyperprior decoder. In an aspect, hyperprior side information z may also be combined into the encoded bitstream, for example in box 612. Additional aspects of multi-stage neural network encoding including encoding of a latent array y and hyperprior side information z are described below in Section 2.2 for "Multi-stage Prediction with Neural Networks."

Figure 7:
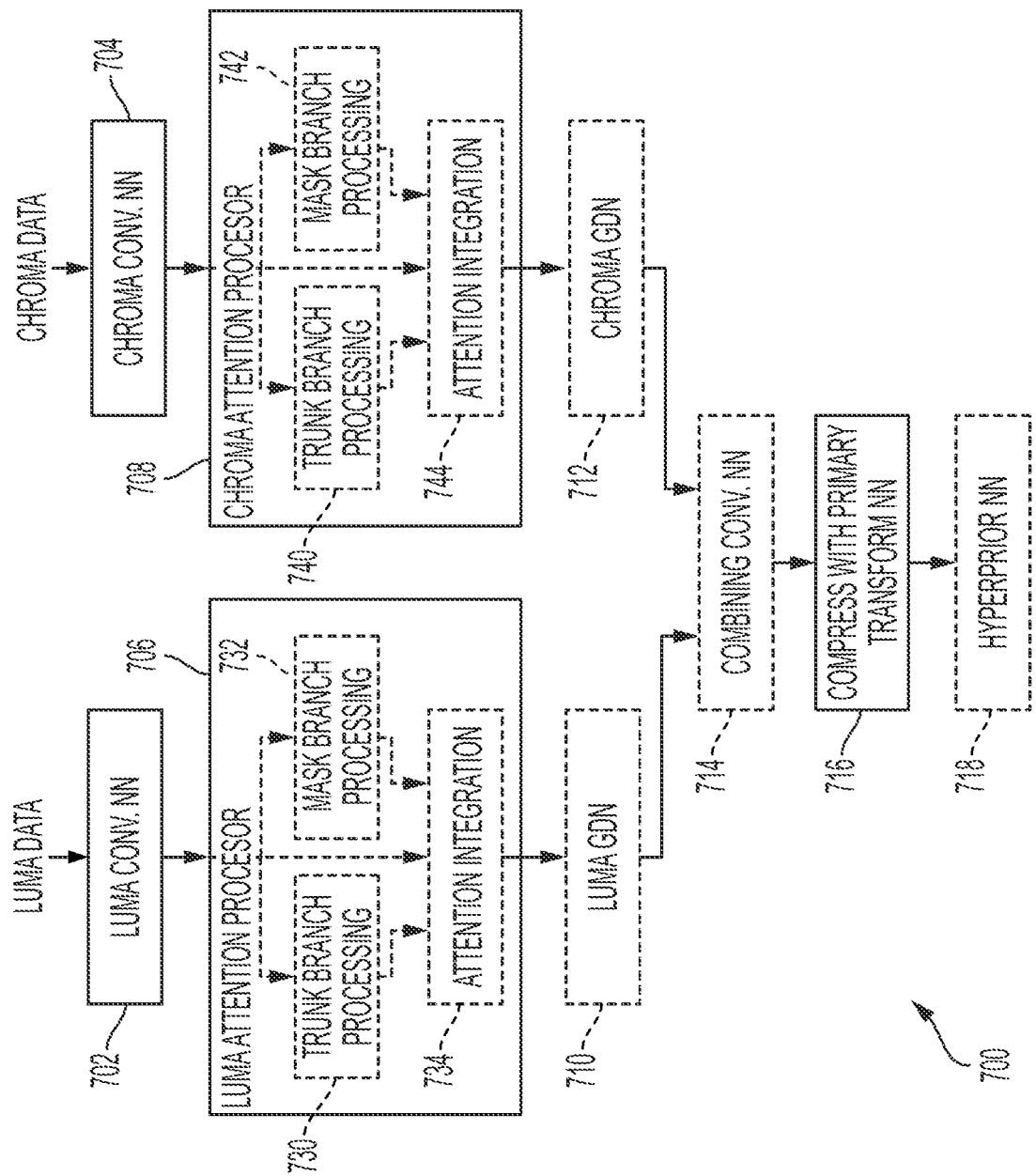
FIG. 7 depicts an example neural network coding method with separate luma/chroma processing.

FIG. 7 depicts an example neural network coding method 700 with separate luma/chroma processing. Luma and chroma data for a portion of source image data may be process separately. The luma data for the portion may be processed by a luma convolutional neural network (box 702) and then by a luma attention processor (706). The chroma data may be processed by a chroma convolutional neural network (704) and then by a chroma attention processor (708). The outputs from the luma and chroma attention processors may then be compressed with neural network (716), for example using the primary transform module $g_a$ of FIG. 8.

In an aspect the luma convolutional neural network and the chroma neural network may be separate neural networks in that weights upon which they are based are separate and trained separately. In another aspect, the luma and chroma attention processors are separate in that weights upon which they are based are separate and trained separately.

In an aspect, an attention processor may include processing the attention processor input with both a truck branch processing (730, 740) and a mask branch processing (732, 742). An attention integration (734, 744) may combine the outputs of the trunk branch and mask branch along with the input to the attention processor to produce the attention processor output. Trunk branch (TB) processing may consist of residual convolutional neural network layers which may allow specific information to pass directly for further processing. For example, given an input x to the attention processor, the output of the trunk branch may be y1=x+TB (x). Mask branch (MB) processing may consist of residual neural network layers along to produce element-wise masks. For example, given an input x to the attention processor, the output of the mask branch may be y2=MB(x). Attention integration (2334, 2344) may include masking the trunk branch with the element-wise masks. For example, attention processing output may be y1*y2+x.

In an aspect, separate generalized divisive normalization (GDN) processors for luma and chroma may be applied respectively to the outputs of the luma attention processing (optional box 710) the chroma attention processing (optional box 712). In another aspect, the output of the separate luma and chroma processing may be combined using a convolutional neural network (optional box 714). In yet another aspect, the result of the processing with the primary transform neural network (716) may be further processed with a hyperprior neural network (optional box 718), such as in FIG. 8. Additional aspects separate luma and chroma processing are described below in Section 2.1 for "Attention Processor with Neural Networks," such as regarding FIG. 9A.

1. Host Codec as a Conventional Block-Based Codec

A hybrid neural network compression system, such as those of FIGS., as its name implies, may integrate a neural-network based encoder with tools of a block-based encoder. A block-based image/video encoder may consist of an encoder and decoder and can compress image and video data for transmission and storage. Some examples of conventional video technologies are H.264 (AVC), H.265 (HEVC), H.266 (VVC), and AV1. Conventional codecs are usually block-based, and they first partition an image or a video frame into smaller image patches or regions called as coding blocks. This partitioning may be a multi-stage process where a full image or video frame is split into coding-tree units (CTUs) or super-blocks. These super-blocks are usually greater than 64×64 pixels and can range up to 256×256 pixels or even larger. A super-block can then be further divided into smaller coding blocks (e.g., these can be as small as 4×4 pixels) for finer processing of the underlying data. An image or video encoder may select a set of compression or coding tools to compress the coding blocks or frames of an image based on rate-distortion costs.

FIG. 2 illustrates, after removing optional (dashed line) components (e.g., selector 290 and neural network encoder 292), an encoder similar to the H.266, where each input frame is first split into coding blocks. Most conventional video coding systems including HEVC, AV1 follow a similar logic as these non-dashed-line components of FIG. 2. After the partitioning stage, a video encoder can predict pixel samples of a current block from neighboring blocks (i.e., by using intra prediction tools) or from temporally different frames/blocks (i.e., using inter prediction/motion compensated prediction). The prediction stage may have the effect of reducing the spatially or temporally redundant information in coding blocks from neighboring samples. The resulting block of information after subtracting the predicted values from the block of interest is usually called the residual block. The encoder then applies a specific transformation on the residual block using variants of the discrete cosine transform (DCT) or the discrete sine transform (DST), or other practical transformation.

The transform stage provides energy compaction in the residual block by mapping the residual values from the pixel domain to some alternative Euclidean space. This transformation may have the effect of reducing the number of bits required for the coefficients that need to be encoded in the bitstream. These coefficients may be later quantized using a quantizer. Quantization can drastically reduce the number of bits required to be transmitted. However, it can also cause significant loss of information especially at higher quantizer values/lower bitrates. In such cases, this can lead to a visible distortion or loss of information in images/video. The tradeoff between the rate (amount of bits sent over a time period) and distortion is often controlled with a quantization parameter (Qp).

In the entropy coding stage, the quantized transform coefficients, which usually make up the bulk of the final output bitstream, may be signaled to the decoder using lossless entropy coding methods such as multi-symbol arithmetic coding in AV1 and context-adaptive binary arithmetic coding (CABAC) in AVC, HEVC, and VVC. Furthermore, where necessary, certain encoder decisions, such as the partitioning size, intra prediction options (e.g., weighed intra prediction, multi-reference line modes, etc.), type of transform, and other additional tools such as a secondary transform mode, may be encoded in the bitstream to let the decoder know the final encoding decision. This information may be considered as side information and usually accounts for a smaller portion of the final bitstream as compared to quantized transform coefficients. In addition, restoration and loop-filters can be used on the reconstructed images (e.g., after decompression) to further enhance the subjective quality of reconstructed images. This stage often involves de-blocking filters to remove boundary artifacts due to partitioning, and restoration filters to remove other artifacts, such as quantization and transform artifacts.

The conventional video and image codecs can be seen as a collection of numerous smaller coding tools. These tools can range in number anywhere from 20 to 40 in existing video coding standards. Example coding tools include motion and spatial prediction, partitioning, energy compacting transforms such as a DCT or DST, quantization, entropy coding, loop filters, etc. The ongoing trend is that more tools are added as new conventional codecs are developed. Each smaller coding tool achieves a specific task and can make certain mathematical assumptions about the underlying data. These tools may often be hand-tuned with trial and error during the development effort. For example, partitioning algorithms mostly divide the image into square or rectangular blocks at different sizes. The partitioning sizes and shapes available to the encoder may be experimentally hand-picked by developers in consideration of overall complexity and performance. Transforms may be DCT or DST based and may be implemented differently for different block sizes or prediction types.

Finally, conventional codecs often perform chroma sub-sampling. This involves first doing a linear transformation of the original image or video frames into a luma (Y) component and two blue and red chroma (Cb, Cr) components. The luma component may be perceived as a grayscale image, and may be an approximation of the luminance of the signal, and it captures important characteristics of the image according to the human perception. The luma component may capture the edges, shape, and high-frequency content that the human brain may tend to focus on. The chroma components, on the other hand, may contain the color information of an object or a scene. A spatial downsampling operation is often performed on the chroma components. such that for every 4 luma samples, only 1 Cb and 1 Cr chroma samples may be kept prior to compression. An example is that, for a 128×128 luma block, only 64×64 Cr and Cb samples may be considered. This is known as 4:2:0 chroma subsampling. There are also other common subsampling formats such as 4:2:2 and 4:0:0.

2. Neural Networks in Image and Video Coding

A neural network (NN) based image and video compression system typically consists of a cascade of smaller NN modules, where each smaller module may have "layers" (or a collection of weight and bias coefficients). These layers can perform a variety of multiplication, convolution and normalization/non-linearity operations on the input images and video. Once an NN structure is defined, the weights may be trained from thousands of example image/video image patches until convergence is established in some metric space. In FIG. 8, an example neural network based end-to-end image compression scheme is shown, including analysis neural networks $g_a$, and $h_a$ and synthesis neural networks $g_s$ and $h_s$. At the encoder side a neural network module compresses the images into bitstreams and at the decoder side, a decoder network can decompress those bitstreams back into images patches, coding blocks or frames. Unlike FIG. 2, there may be no explicit need to define a number of coding tools, but the NN tries to learn the best set of weights during the training process to achieve the compression task.

The training stage involves defining a loss objective such as the mean squared error (MSE), MS-SSIM or some other subjective or objective metric. It also tries to minimize the number of bits encoded by the entropy coding stage, e.g., using an arithmetic encoding (AE) engine.

In the example shown in FIG. 8, the primary transform module $g_a$ at the encoder end uses a serial cascade of 2D spatial convolution operations with spatial downsampling followed by a normalization operation called Generalized Divisive Normalization (GDN), which normalizes the features obtained by the convolutional layers. As each layer downsamples the image by a factor of 2, the output of the primary transform has fewer coefficients than the number of pixels in the input image (i.e., compressed version of input). These output coefficients y can be quantized (box labeled "Q" in FIG. 8) into 9, which may then can be entropy encoded into a bitstream (checkerboard boxes in FIG. 8) for example using arithmetic encoding (AE) methods. This stage resembles the transform and quantization stage in conventional video codecs; however, it can implicitly perform other operations as well such as intra prediction without specifying this need.

Furthermore, additional side information can be obtained from the output coefficients using an additional neural network, such as the hyper-prior module $h_a$ in FIG. 8, which can assist to further reduce redundancy in the output coefficients $\hat{y}$ at the cost of signaling side information $\hat{z}$. Side information $\hat{z}$, may include, for example, quantized output from a hyperprior encoder $h_a$ of FIG. 8. In FIG. 8 this side information $\hat{z}$ can be used to derive values related to the output coefficients 9 from the first stage, which can aid the first AE stage in compressing these coefficients $\hat{y}$ more efficiently. The side information $\hat{z}$ may include, for example, a prediction of a mean ($\mu$), a variance ($\sigma$), and quantizer elements ($\delta$). The decoder side performs arithmetic decoding (AD) and implements the inverted operations of the encoder and maps the decoded coefficients into a final reconstruction.

In video coding, additional modules can be added to FIG. 8 to perform a variety of motion compensation/inter-prediction tasks by using separate NN submodules. The effort here is to compress a collection of video frames (or a group of pictures or GOPs) instead of a single image.

2.1 Attention Processor with Neural Networks

In one embodiment, a neural network codec may conform with the 4:2:0 chroma subsampling that is predominant in conventional codecs. For example, a neural network modules can be used to perform both 4:2:0 subsampling and to extract more informative features from luma and chroma image data components. This approach may work on top of the end-to-end solution summarized in FIG. 8 for integrating the NN-module with subsampling codecs. In one embodiment, such 4:2:0 NN modules are shown in FIG. 9 (i.e., two variants: Model 1, shown in FIG. 9A, and Model 2, shown in FIG. 9B). In Model 1, the capital Y on the top left square represents an input luma component (e.g., 128×128 pixels). The U and V channels may be the corresponding subsampled chroma inputs (2×64×64) and are shown below as smaller squares. The first convolutional layer after Y (i.e., cony N×5×5/2) subsamples the luma component by a factor of 2 with 2D convolution operations. U and V also pass-through convolutional layers but there is no subsampling for those. Therefore, the inputs to the "Attention" blocks have equal spatial dimensions. Attention blocks consist of residual layers and convolutional layers and try to focus on distinct features and complex regions of luma and chroma components separately with masking. These residual networks may be implemented separately for luma and chroma channels to provide additional compression benefits.

In another embodiment, luma pixel blocks may be reshaped from 1×128×128 to 4×64×64 (from 1 channel of 128×128 blocks into 4 channel of 64×64 inputs) and combine with U and V, to end up with 6×64×64 components representing all Y, U, V components. In an alternative embodiment, subsampling of convolutional operations and additional NN layers can be used to achieve other subsampling formats. For example, to achieve YUV 4:4:4 format, either subsampling for luma can be removed or alternatively, U and V components can be subsampled by 2 during convolution operations.

In one embodiment, the features of Y, U and V channels can be summed together or passed through a combination of NN layers (e.g., cony N×1×1/1 block in FIG. 9) this step may have the effect of combining the most informative features jointly from both luma and chroma components. In model 2 in FIG. 9, another approach is shown where the attention layer comes after such combination, in contrast to Model 1 where the attention blocks were per the luma and chroma components separately. In contrast, Model 2 has no specific attention layers for luma and chroma separately. Model 2 has less weights and trainable parameters as compared to Model 1 and is somewhat simpler. However, the compression benefits may be lower.

Figure 10A:
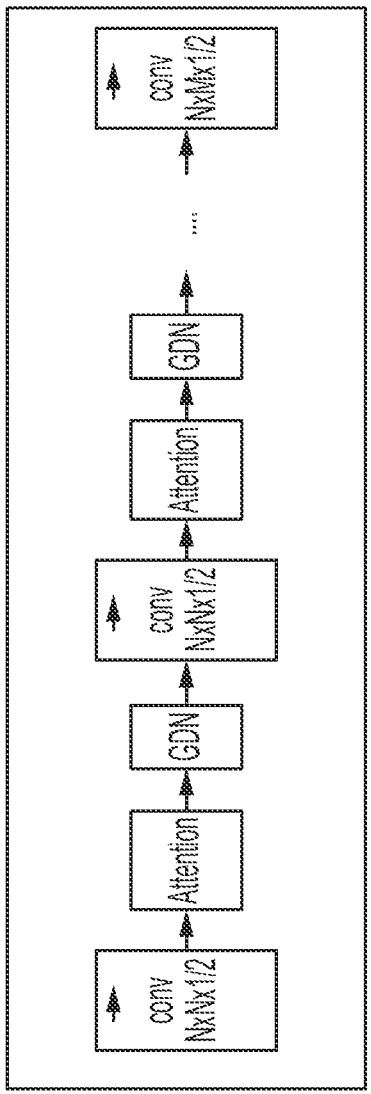
FIG. 10A depicts an example primary transform module with attention processors.
Figure 10B:
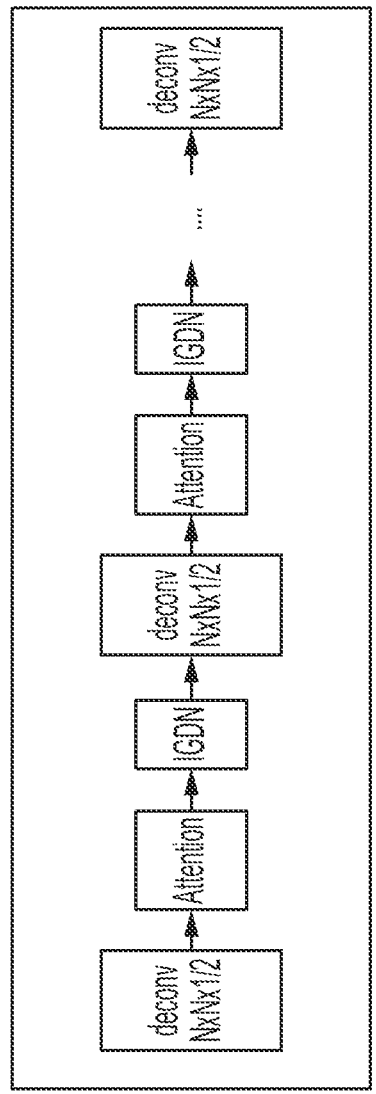
FIG. 10B depicts an example inverse transform module with attention processors. neural network encoder and decoder for separate luma/chroma processing and separate attention processors (Model 1).

In one embodiment, the largest module "AMR Transform & HyperPrior" in FIG. 9 follows a similar structure to FIG. 8 and contains both the transform and inverse transform modules as well as the hyper prior modules. However, it also has additional attention modules in between the convolutional layers and GDN normalizations. The attention layers capture "attentively" regions of interest (edges, shapes, high-entropy regions) in feature maps resulting from convolutional layers. One example is shown in FIG. 10A/B, which shows a modified transform and inverse transform module to replace the FIG. 8 transform and inverse transform modules. The hyper prior modules in FIG. 8 can also have a similar structure and be modified accordingly. In other designs, GDN and Inverse GDN (IGDN) can be replaced by arbitrary normalizations such as a rectified linear unit (ReLU), Leaky ReLU, etc.

2.2 Multi-Stage Prediction with Neural Networks

Figure 11:
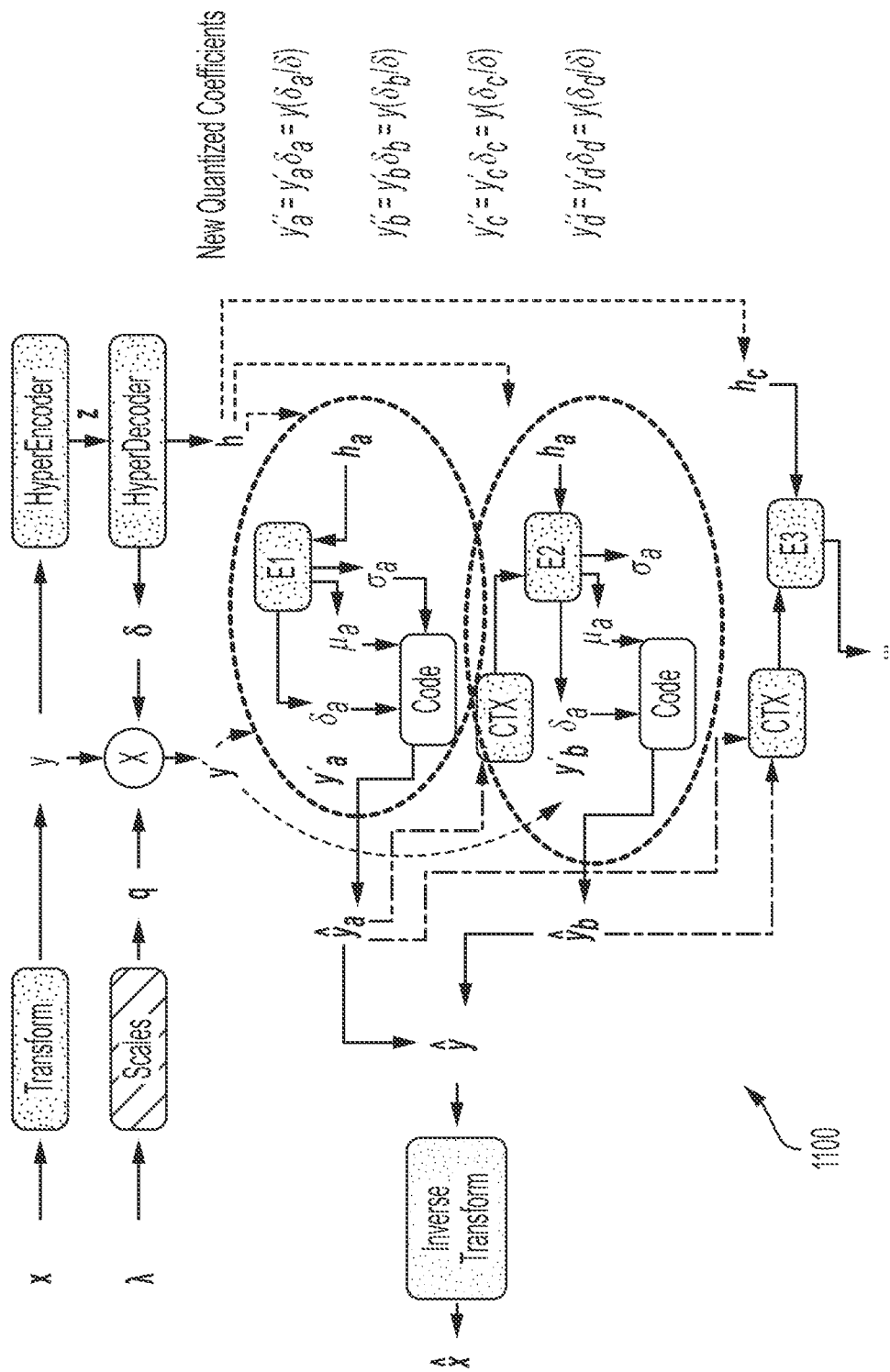
FIG. 11 depicts an example neural network encoder.

In an embodiment, the encoding flow with an alternative NN architecture is shown in FIG. 11. This illustrates an encoding and reconstruction flow that improves upon the AMR Transform & HyperPrior framework described in FIG. 9. This NN architecture involves additional entropy networks (E1, E2, E3, . . . ) and entropy context models (CTX1, CTX2, . . . ) in the entropy coding stage. The main flow is as follows: an input image/frame x is first transformed into latent representation y. Note that in case of chroma sub sampling (e.g., YUV 4:2:0), x represents both luma (Y) and chroma (U, V) channels as in FIG. 9 (Model 1, left-hand side) and Transform block in FIG. 11 includes the YUV network shown in FIG. 9 with attention modules.

The encoder may take a compression level $\lambda$ integer as an input, which a neural network may map to a quantization matrix q through a learned pool of matrix "scales". The matrix q may be globally learned from the training set at training time and is considered static at inference time.

The hybrid encoder further may extract side information z from the latent y. The hyper decoder, which is implemented both at the encoder and decoder, then uses this side information to find another 3D quantizer $\delta$. This quantizer may be an adaptive quantizer that can quantize by considering local characteristics of the latent variable y and can change the quantization step size per location and channel of y. The value of $\delta$ may be dynamic and content adaptive at testing time. The latent y may be scaled with both the quantization matrix q and the 3D quantizer $\delta$. The scaled latent then may be rounded to become discrete. The scaling and rounding process may be called "global and adaptive quantization" herein. A context-dependent secondary quantizer is also discussed below.

Figure 12B:
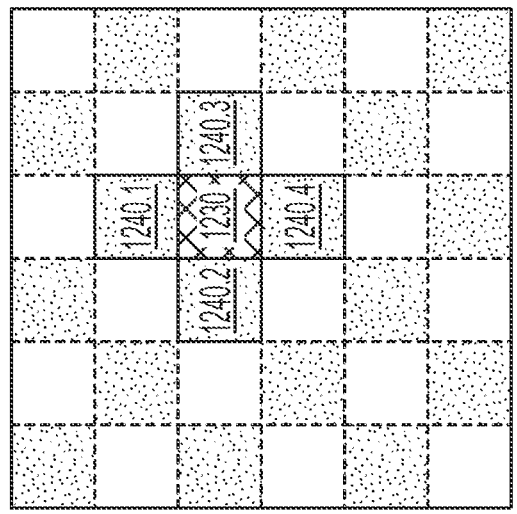
FIG. 12B depicts an example checkerboard causal context model for prediction.
Figure 12A:
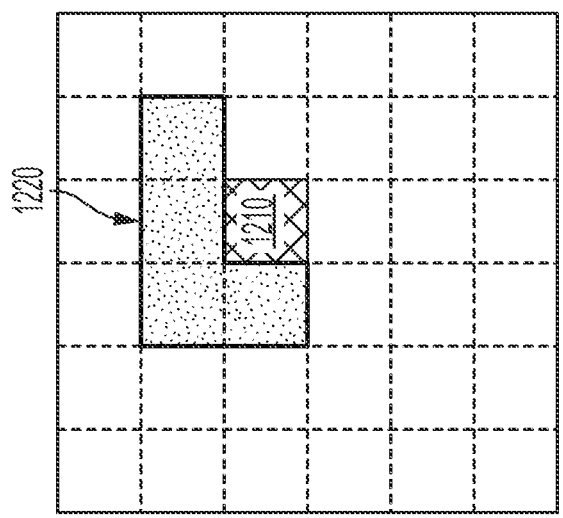
FIG. 12A depicts an example raster-scan causal context model for prediction.

In one embodiment, a context based NN module or sub-network can be integrated to the NN based image compression method as shown in FIG. 11 (as shown with CTX blocks). The context networks first may predict a latent coefficient using a neighborhood (or context) of previously coded latent coefficients. This may be done with multi-pass causal decoding where multiple contexts can be defined, and each individual context first predicts/decodes a specific set of locations before the encoder/decoder starts using another context. FIG. 12A illustrates a sample 1210 as the coefficient that is to be predicted, where a context of previously decoded values 1220 (above and left samples of the middle sample) within a predetermined distance of the sample 1210 can be used to predict this coefficient 1210 prior to encoding. Then this prediction can be passed to an entropy network (e.g., E1, E2, E3) along with the output of the hyper-decoder in FIG. 11 to model various characteristics of the predicted sample to be encoded including the mean, variance and the optimal local quantizer for the present context. The autoregressive nature of such a context scheme requests sequential decoding of each codeword, which may be impractical. Parallelism may be introduced by splitting the codewords into groups with a multi-pass approach. For example, the codewords may be split into a two groups with a checkerboard patterns (FIG. 12B), where each group corresponds to spatial locations that are substantially uniformly distributed over the area of an image (or substantially uniformly distributed across a two-dimensional matrix of ŷ values). In a first pass, an anchor group may be decoded without context modeling. In a second decoding pass, the non-anchor group can use the anchor group as context. Thus, a sample 1230 may be predicted from previously-decoded values 1240.1-1240.4 within a predetermined distance of the sample 1230 prior to encoding. This allows parallel context modeling in two decoding passes. However, compression efficiency may be compromised since only half the pixels have context and the context model only uses four neighbors. A 4-pass context model for increased compression benefits is presented below.

Figure 13B:
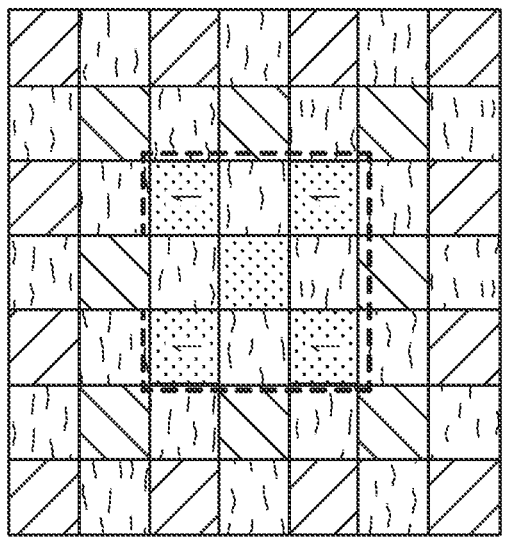
FIG. 13B depicts an example second pass in a checkerboard pattern prediction.
Figure 13D:
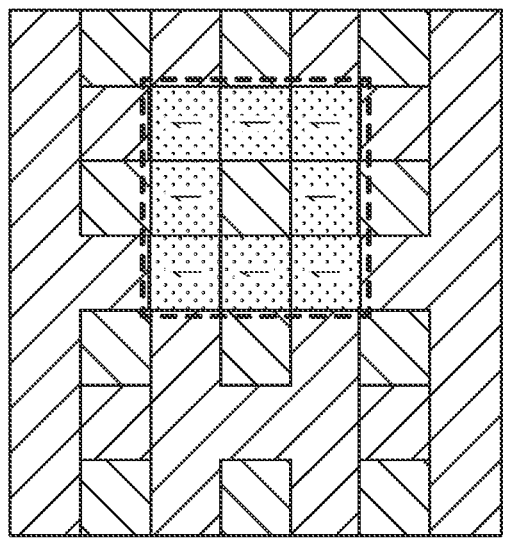
FIG. 13D depicts an example fourth pass in a checkerboard pattern prediction.
Figure 13A:
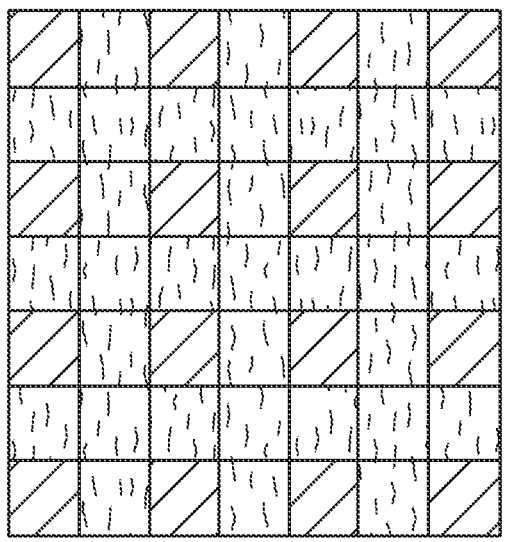
FIG. 13A depicts an example first pass in a checkerboard pattern prediction.
Figure 13C:
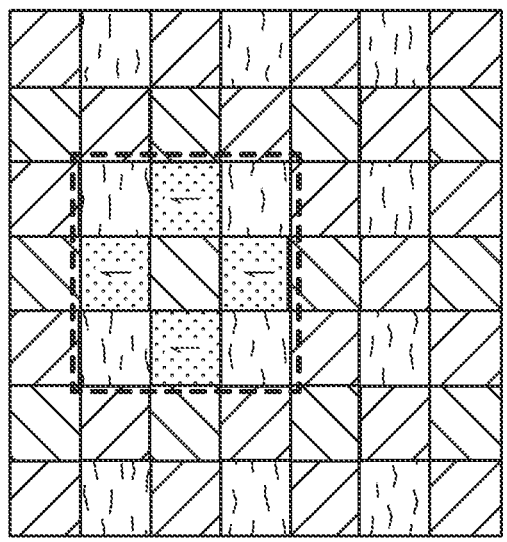
FIG. 13C depicts an example third pass in a checkerboard pattern prediction.

In an alternative embodiment, several contexts can be defined to mask and encode different spatial regions of the latent coefficients. For example, a 4-stage process may be used for context-based encoding and decoding. In FIG. 13A, in the first stage, first samples (with straight diagonal shading) may be encoded (for example without prediction), and these first samples may then be available at the decoder side for prediction at the second stage. This is shown in FIG. 11 with the thick dashed oval region that contains E1 entropy network. The entropy network models the mean ($\mu\_a$), variance ($\sigma\_a$) and a separate local quantizer ($\delta\_a$). At the second stage, a context region is defined, as shown with small dashed square around the center 9 samples in FIG. 13B. In this stage the first samples may be available (due to stage 1 coding), shown with "1" within the dashed squares, and the goal is to predict and encode second samples. A context NN model first tries to predict these second samples using the previously decoded first samples from the first stage of encoding. This context model is shown in FIG. 11 towards the left-hand side of E2 entropy network. The entropy network takes in the output/prediction of the context and model the mean ($\mu\_b$), variance ($\sigma\_b$) and a separate local quantizer ($\delta\_b$) specific for this mask then the arithmetic encoder encodes these second samples given all this information. In stage 3, a separate context model uses the decoded second samples from stage 2 (now labeled "1" in FIG. 13C) to predict third samples in FIG. 13C and an entropy network (E3) models the mean, variance and local quantizer for these samples. These variables and samples may then be used to encode the third samples. Lastly, a final context model (now shown in FIG. 11) can use all prior coded the samples in the context region shown in FIG. 13D (including the first, second and third samples, all labeled "1" in FIG. 13D) to code the remaining fourth samples. As it is evident, this multi-stage process is sequential and causal. The number of context models can be decided based on decoding time constraints and compression efficiency. At the decoder side, the decoder needs to decode each context regions sequentially in a causal manner.

In an alternative embodiment, the context models can be defined spatially as in FIG. 13A-13D and can also extend per channel (per color component). That is the context neighborhoods can be 3D maps that encompass both location and channel information since the latent variable usually consists of C channels, N×M spatial samples (e.g. C×N×M).

In an alternative embodiment, a final quantizer for a context-coded region can be defined as $\delta \times q \times \delta\_a$ e.g. product of separate global, variational and context dependent quantizers where $\delta\_a$ is the quantizer specific to a context model a. $\delta\_a$ can be either a 2D or 3D variable.

The probabilistic compression models described so far shape the codewords in Gaussian distributions and signal their descriptions ($\mu$, $\sigma$) so they may be available at both the encoder/decoder side for the entropy coder. Oftentimes a significant amount of codewords may be confidently zero (zero mean, small sigma). Coding them individually can cause nontrivial overhead. In one embodiment, these zeros may be efficiently coded as follows. First, the codewords may be sorted in ascending order by their corresponding sigmas. Next the leading codewords (that are most likely to be zero) may be grouped to form "zero groups". The size of a zero group is determined by the joint probability of all group members being zero with criteria that may be shared at both the encoder/decoder side. This joint probability is also used to entropy code the zero group to signal if its members are indeed all zeros. If that is true, all codewords in the group may be recovered. Otherwise, each member is further coded separately using their individual distributions. The hyper parameters of the group forming criteria can be optimized for each content and signaled at the frame or sequence level.

Figure 24A:
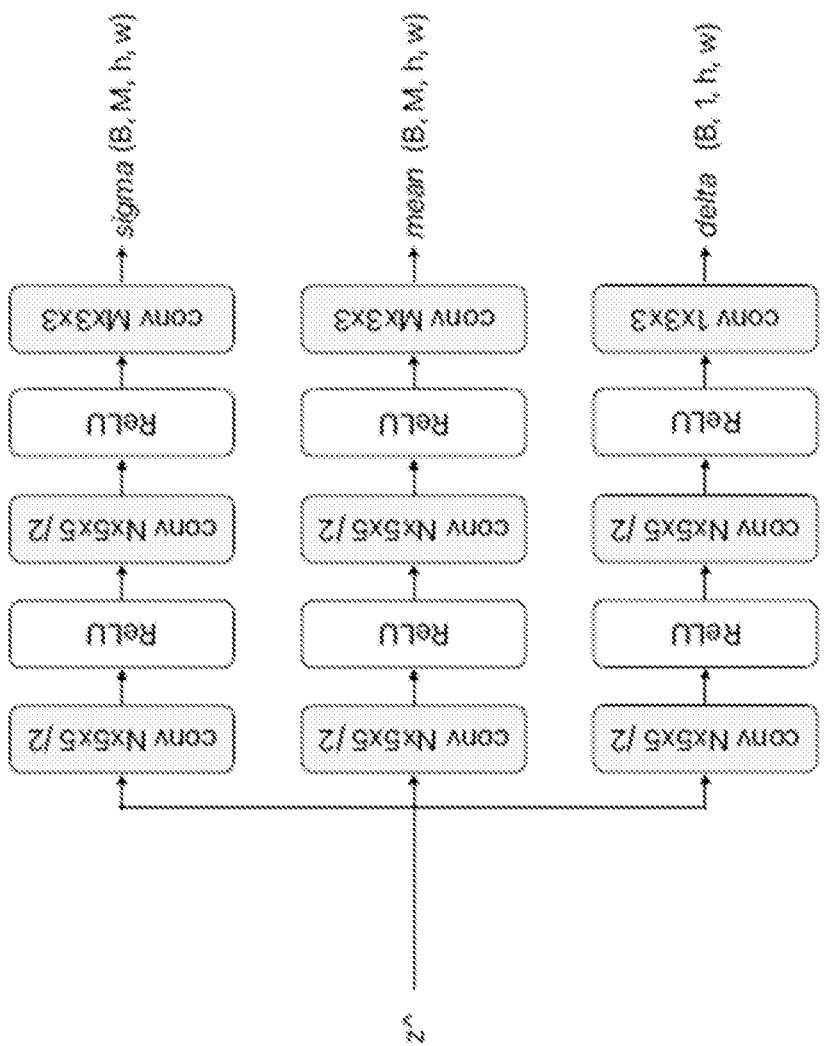
FIG. 24A depicts an example hyperprior decoder with separate processing trunks for different hyperprior size information values.
Figure 24B:
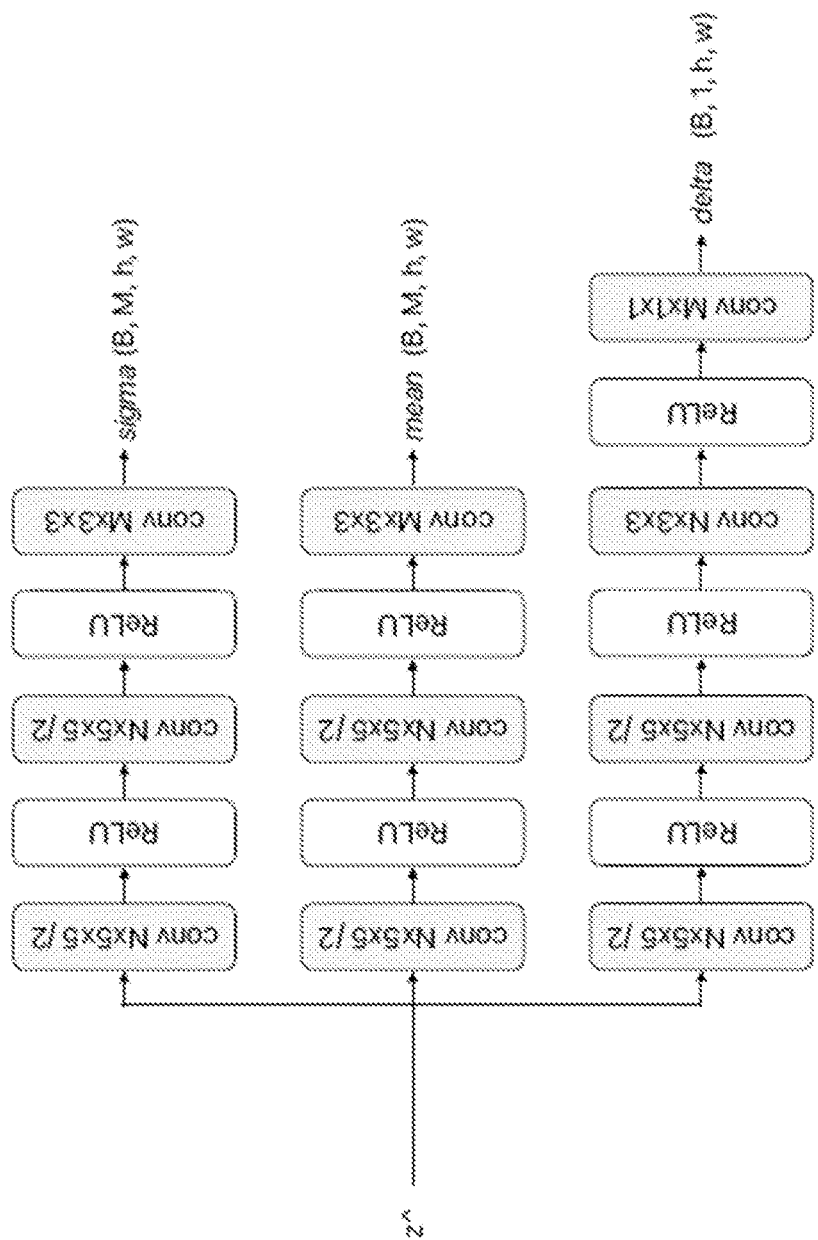
FIG. 24B depicts an example hyperprior decoder with separate processing trunks with different trunk lengths.
Figure 24C:
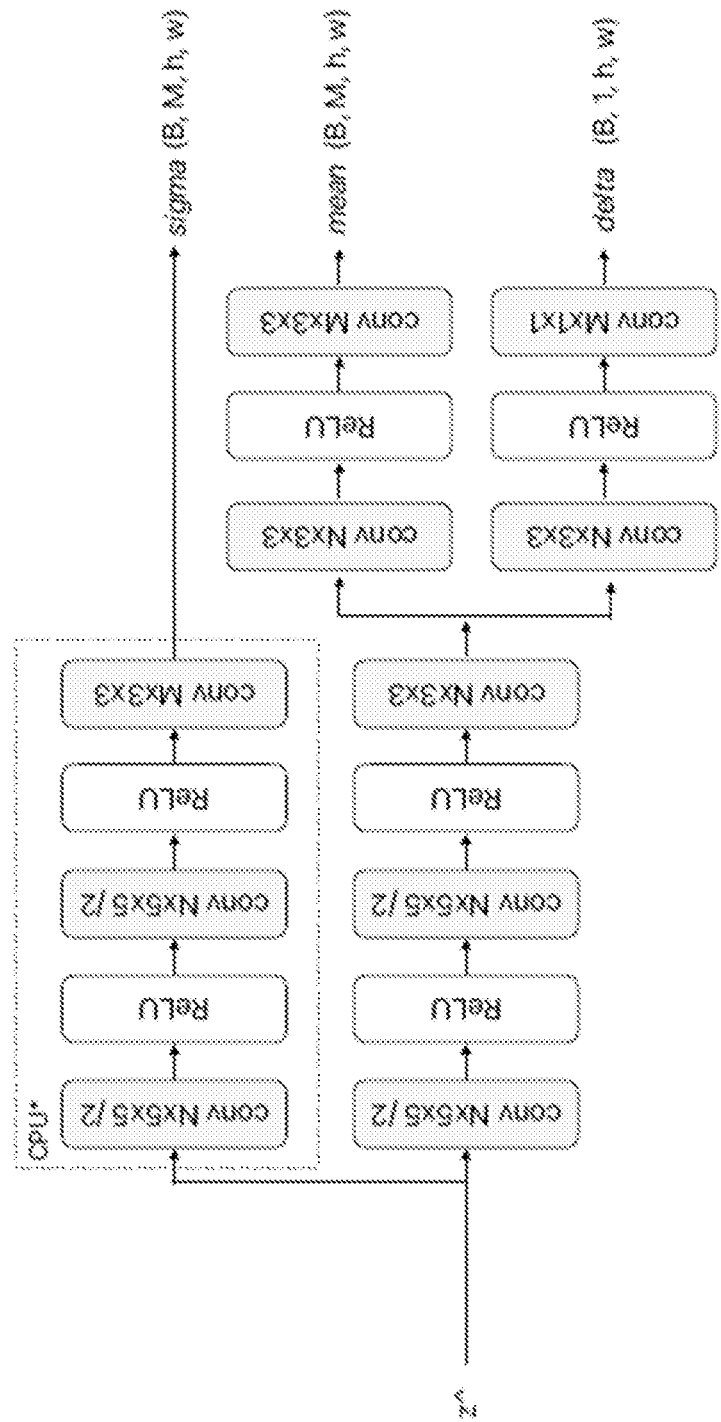
FIG. 24C depicts an example hyperprior decoder with separate processing trunks and some shared operations along the separate processing trunks.

In one embodiment, the hyper-prior synthesis transform (e.g., hyperprior decoder $h_s$ of FIG. 8) may be simplified to improve the latency at the decoder side by leveraging a multi-head prediction structure depicted in FIG. 24C. This prediction structure requires less parameters and therefore lesser arithmetic operations by using a common prediction branch. From this common prediction branch multiple sub-branches can be defined out to predict the final mean ($\mu$), variance ($\sigma$) and local quantizer elements ($\delta$). Multiple branch structures are possible, for example all the outputs can share the same branch, or only two of them, as in FIG. 24C. In another variant, the sub-branches are spawned out at different depth of the main trunk network as in FIG. 24B. This may also enable computation at different precision levels between branches. For example, some elements of hyperprior side information ẑ may require bit-exact calculations to ensure perfectly reproducible, for example when computing the variance ($\sigma$), while other elements of the size information may not require bit-exact calculations and hence may be calculated for efficiently, such as on a faster inference device.

2.3 Neural Networks Training Based on Image Content

In an alternative embodiment, multiple NN models can be trained to target different types of content or depending on different quality requirements. For instance, a first NN model an NN can be specifically tuned/trained for screen-content or animation content. A separate second NN model can be trained for natural content (e.g., natural videos/movies etc.) specifically targeting compressing content with very low bitrate usage, e.g., 0 to 0.2 bits per pixel (bpp). Another third NN model can be trained for 0.2 bits per pixel to 0.5 bpp range and an a further fourth NN model can specifically target very high bitrates. The host codec can alternatively select a model index depending on an assessment and/or parameters such as quantization parameters/image pixel variance etc. The decoder can either infer which model index to use from the already decoded part of the bitstream, or either by decoding a low-level or a high-level flag that can be signaled from the encoder to the decoder side.

In an alternative embodiment, weights/biases or other parameters pertaining to the NN structure can be modified online based on processed content or certain parts of the NN model can adapt to the processed data. In this case, the modified weights/biases or coefficients (or change in the values, e.g., delta coefficients) can be explicitly signaled in the bitstream to the decoder side using the host codec's entropy coding process. Alternatively, such a signaling can be avoided for certain model parameters and can be inferred at the decoder side based on previously decoded information from neighboring blocks/or decoded pixel values/statistics.

3. Hybrid Coding

In the present invention, a hybrid image and video coding approach based on a combination of an NN-based image and video compression system and a block-based video codec is described. This hybrid approach can combine the coding tools of an existing video codec with a NN-based image and video compression system, such as depicted in FIGS. 2 and 8, to inherit the compression benefits of those two systems.

In an embodiment, an NN-based compression process can be integrated into an existing image/video coding system (such as a conventional coding system) to replace or bypass parts (or certain coding tools) of existing "host" codec. The hybrid coding approach can encode a 1) entire image or video frame in an end-to-end fashion, 2) sub-patches, such as tiles, or coding blocks of an image or video frame, or 3) other information such as the residual part of an image after intra or inter prediction or alternatively 4) can encode a group of pictures (GOP) or image patches, 5) can also be used to enhance information similar to a loop filter. A NN system can be responsible for taking in the input data and producing a set of weights to be encoded by an entropy, e.g., arithmetic, coding engine, and can also be responsible for the decoding of such data.

In another embodiment, a block-based image or video decoder may be configured to determine whether a block or a specific region of an image, or other information needs to be compressed in an end-to-end manner with learned/trained coefficients with the NN-based system instead of using existing operations of the host video codec. If the host codec decides it is beneficial to use the NN-based end-to-end compression process instead of its existing coding tools for a particular region or coding block of an image, then the host codec can bypass its existing coding tools and can try to compress an image/frame/block using the NN system presented above. If the host codec decides that it is not beneficial to use the end-to-end framework, then the NN architecture can be skipped by the encoding process.

In one embodiment, a video encoder may provide signaling information that identifies to the video decoder whether the end-to-end NN architecture will be used or not during the encoding/decoding process. This can be achieved by 1) signaling side information from the encoder to the decoder side (e.g., by signaling one or more relevant coding block flags/indices or information) and/or 2) higher level frame/picture or sequence level flags/indices or information, and/or 3) inferring or estimating relevant mode decisions from the previously decoded information. Moreover, the decoder may implement the parsing and decoding logic of switching relevant operations between the host codec and the NN-based system, trained neural network weights and relevant operations to successfully decompress the image/video information.

The NN model can be trained offline using neural networks and can be integrated as an extension into existing video coding technologies such as the H.264, H.265, H.266 and AV1 standards, such that an entire collection of tools or parts of the partitioning, transform, quantization, entropy coding, and filtering operations of the host codec can be bypassed. Such a structure works together with an existing video codec to either fully compress images and video frames or smaller blocks and image patches.

3.1 Frame-Level Hybrid Control

Figure 15A:
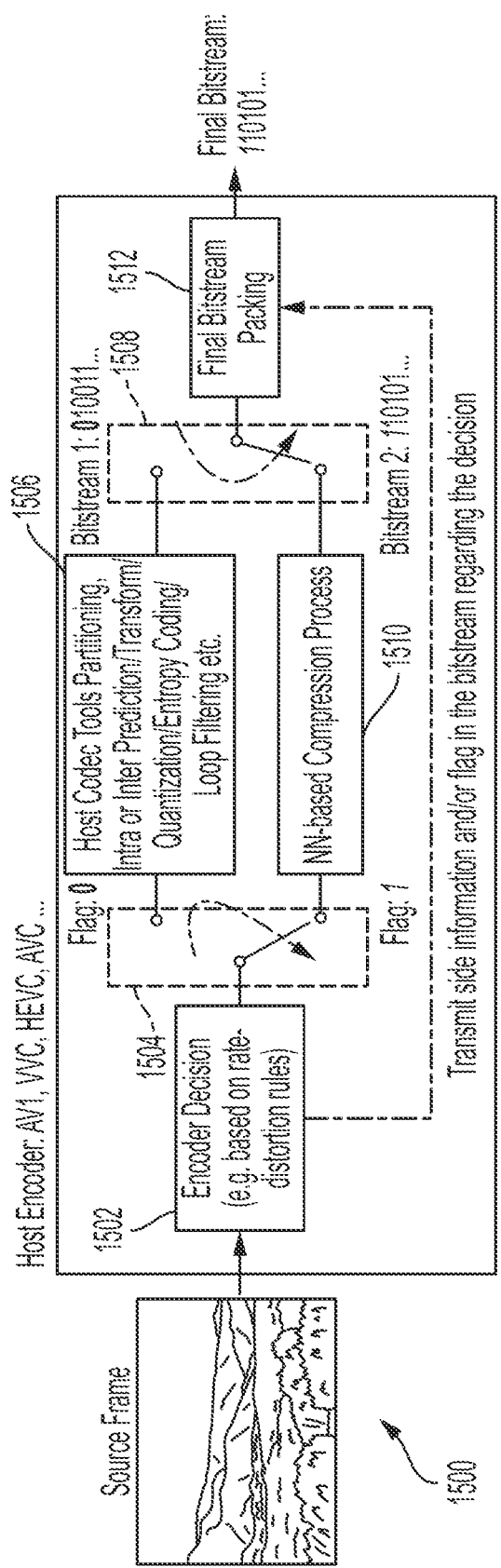
FIG. 15A depicts an example encoder with hybrid host and neural network coding tools.
Figure 15B:
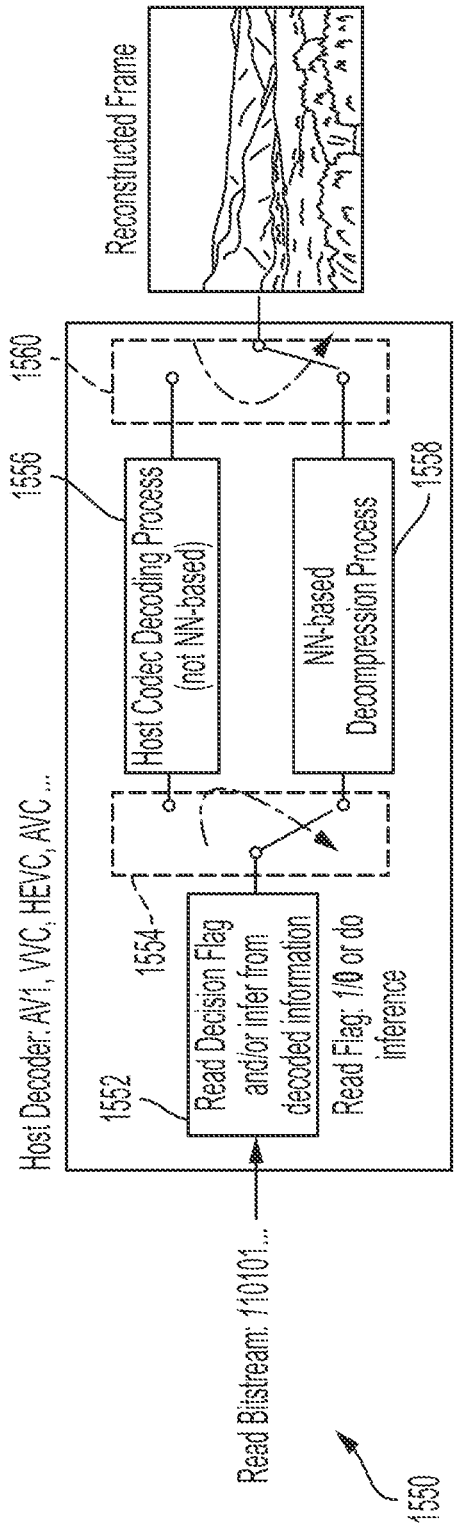
FIG. 15B depicts an example decoder with hybrid host and neural network coding tools.

FIGS. 15A and 15B depict an example encoder 1500 and decoder 1550, respectively, with hybrid host and neural network coding tools. In FIG. 15A, for a portion of image data input to encoder 1500, such as source frame, encoder decision unit 1502 controls switch 1504 for selecting between a first codec's encoding tools, such as host codec's tools 1506, and an alternate codec's coding tools, such as neural network-based process 1510. Switch 1508 may select a bitstream output from the selected encoding tool for inclusion in a hybrid bitstream by bitstream packer 1512. Side information indicating the encoder selected by the encoder decision unity for the portion of image data may be included also be included in the final bitstream, for example, by the bitstream packer 1512.

Decoder 1550 may operate as a complement to encoder 1500. An encoded hybrid bitstream may be parsed by a decoder control 1552 to identify decoder selection for a portion of image data, such as by identifying a decoder selection flag explicitly encoded in the hybrid bitstream or by inferring the decoder decision from other information in the hybrid bitstream. Switch 1554 may select between a first decoder, such as host codec decoder 1556, and an alternate decoder, such as neural network-based decoder 1558 based on the decoder decision identified by decoder control 1552, and a portion of the hybrid bitstream corresponding to the image portion may be provided to the selected decoder. Switch 1560 may select between the outputs of the first or alternate decoders for inclusion in a reconstruction of the image portion (for example a complete image frame).

In one embodiment, a host codec and the NN-based compression scheme can be combined as in FIG. 15A/B. At the encoder side, an entire source image or frame can be compressed either with the NN-based compression process in an end-to-end manner using the NN architecture shown in FIG. 9, or alternatively the host encoder can decide to compress the entire image using its existing coding tools bypassing the NN-based compression scheme. The process of which compression scheme will be used can be made by the host codec's encoder based on, for example, a rate-distortion (RD) analysis/rules. This is illustrated with the switch after the Encoder Decision block in FIG. 15A/B. If NN compression is not used, the encoder falls back to using its host codec coding tools for the particular frame, whereas if the RD cost is lower with the NN process, then NN compression is used by the host codec. This decision can alter the parsing and decoding process of the host-codec's decoder.

In one embodiment, the bitstream from either the host codec (bitstream 1) or the NN compression process (bitstream 2) can be combined with other side-information by the host codec to form a final bitstream. This information can include whether or not the codec decides to use the NN-based process or host codec tools via relevant flags/indices to be signaled. Since the encoder may provide data to the decoder that identifies the encoder's selection:

In one embodiment, the host codec can signal a high-level flag or index (e.g., nn_compress_enable) to inform the decoder to select an appropriate decoding/parsing process and reconstruction rules for the final image between the host-codec processes and NN-based system. For example, if nn_compress_enable=1 then the final image can be compressed/encoded and decoded/decompressed/reconstructed with the NN-based system instead of the host codec.

In one embodiment, nn_compress_enable flag can be signaled for each frame, or for a collection of frames in the picture header, slice header or frame header.

In another embodiment, the decoder can infer the value of nn_compress_enable from the decoded bitstream to select an appropriate decoding/parsing process and the reconstruction rules for the final image. This will avoid implicitly signaling nn_compress_enable in certain cases.

In one embodiment, if nn_compress_enable=1 then the encoder can compress the image/frame using the NN-module, but the entropy coding process can be done with the host codec's entropy coding tools instead of the NN-based system.

In a particular embodiment, the NN-based system can have a decoding process that is separate from the host codec's decoding process where the compressed information can be parsed orthogonal to the host codec's parsing and decoding process. For example, different frames/tiles of a video sequence can be parsed separately or in a parallel fashion e.g., some tiles/frames can be decoded using host codec's entropy decoding process, some other tiles can be decoded with a separate entropy decoding process designed for the NN-based system.

In an embodiment the parsing and decoding process of the NN-based system can be overlapping and parsing/decoding process of the host codec can be dependent on the parsing decoding process of the NN-based compression scheme. That is, either the host codec or the NN-based compression scheme can have access and use each other's parsing/decoding processes and decoded information, flags, or indices.

3.2 Frame Partition-Level Hybrid Control

Figure 16A:
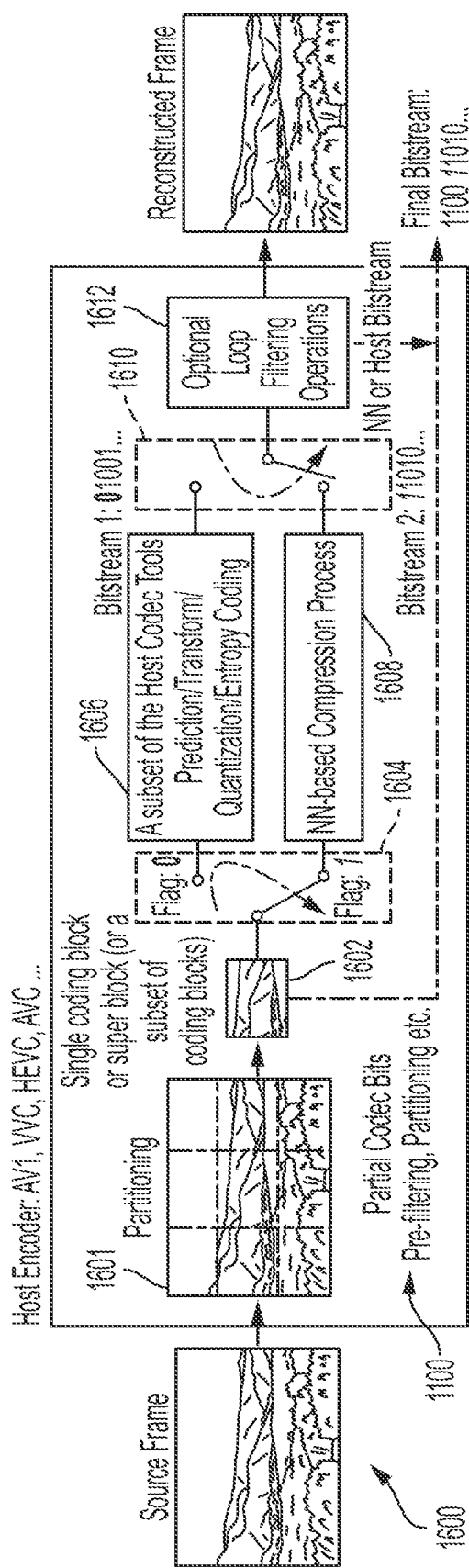
FIG. 16A depicts an example encoder with hybrid host and neural network coding tools with frame partitioning.
Figure 16B:
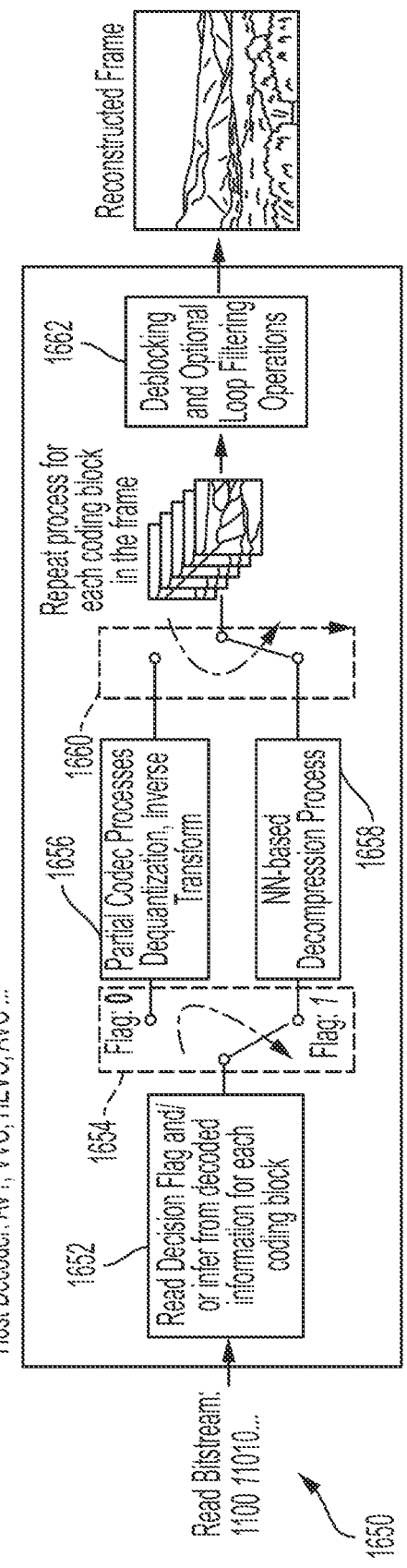
FIG. 16B depicts an example decoder with hybrid host and neural network coding tools with frame partitioning.

FIGS. 16A and 16B depict an example encoder 1500 and decoder 1550, respectively, with frame partitioning for hybrid host and neural network coding tools. In FIG. 16A, a partitioner 1601 may divide frames spatially into portions, such as a blocks or superblocks that are a sub-portion of an image frame. Then for a partitioned portion of a frame, encoder decision unit 1602 may control switch 1604 for selecting between a first codec's encoding tools, such as host codec's tools 1606, and an alternate codec's coding tools, such as neural network-based process 1608. Switch 1610 may select a bitstream output from the selected encoding tool for inclusion in a hybrid bitstream by bitstream packer 1612. Side information indicating the encoder selected by the encoder decision unity for the portion of image data may be included also be included in the final bitstream, for example, by the bitstream packer 1612.

Decoder 1650 may operate as a complement to encoder 1600. An encoded hybrid bitstream may be parsed by a decoder control 1652 to identify decoder selections for a portions of image data, such as by identifying a decoder selection flag explicitly encoded in the hybrid bitstream or by inferring the decoder decision from other information in the hybrid bitstream. Switch 1654 may select between a first decoder, such as host codec decoder 1656, and an alternate decoder, such as neural network-based decoder 1658 based on the decoder decision identified by decoder control 1652, and a portion of the hybrid bitstream corresponding to a partition of an image frame portion may be provided to the selected decoder. Switch 1660 may select between the outputs of the first or alternate decoders for inclusion in a reconstruction of a complete frame. Optional deblocking and/or optional loop filtering may be applied to neighboring decoded blocks and superblocks.

In one embodiment, the NN-based compression scheme can be integrated with the host codec to interact with the host codec's existing coding tools. For instance, the NN-based compression scheme can be applied to individual coding blocks inside the host encoder. In the embodiment shown in FIG. 16A/B, a source frame is partitioned based on a partitioning-tree and RD decisions of the host codec. Then, for each partitioned coding block either the NN-based scheme or the host codec can be used to encode its contents in an end-to-end fashion.

In another embodiment, the host codec's decoder may need to know for each coding block which compression scheme (host coding tools, or NN-based system) is used. This information can be signaled for each partitioned coding block (with an nn_compress_flag=1) using the host codec's entropy coding process. In an alternative embodiment, nn_compress_flag or other related flags/indices can be fully or partially inferred from the statistics of the previously coded blocks at the decoder.

In one embodiment, signaling and decoding steps for the nn_compress_flag can be made at the super-block or CTU level, or alternatively for each coding unit as illustrated in FIG. 16A/B. At the decoder side, in FIG. 16A/B (host decoder part), a decision flag/mode can be either decoded or inferred from the already decoded information. Based on the value of this flag/decision, an NN-based decompression process can be used instead of the host codec's dequantization and inverse transform processes.

Figure 17:
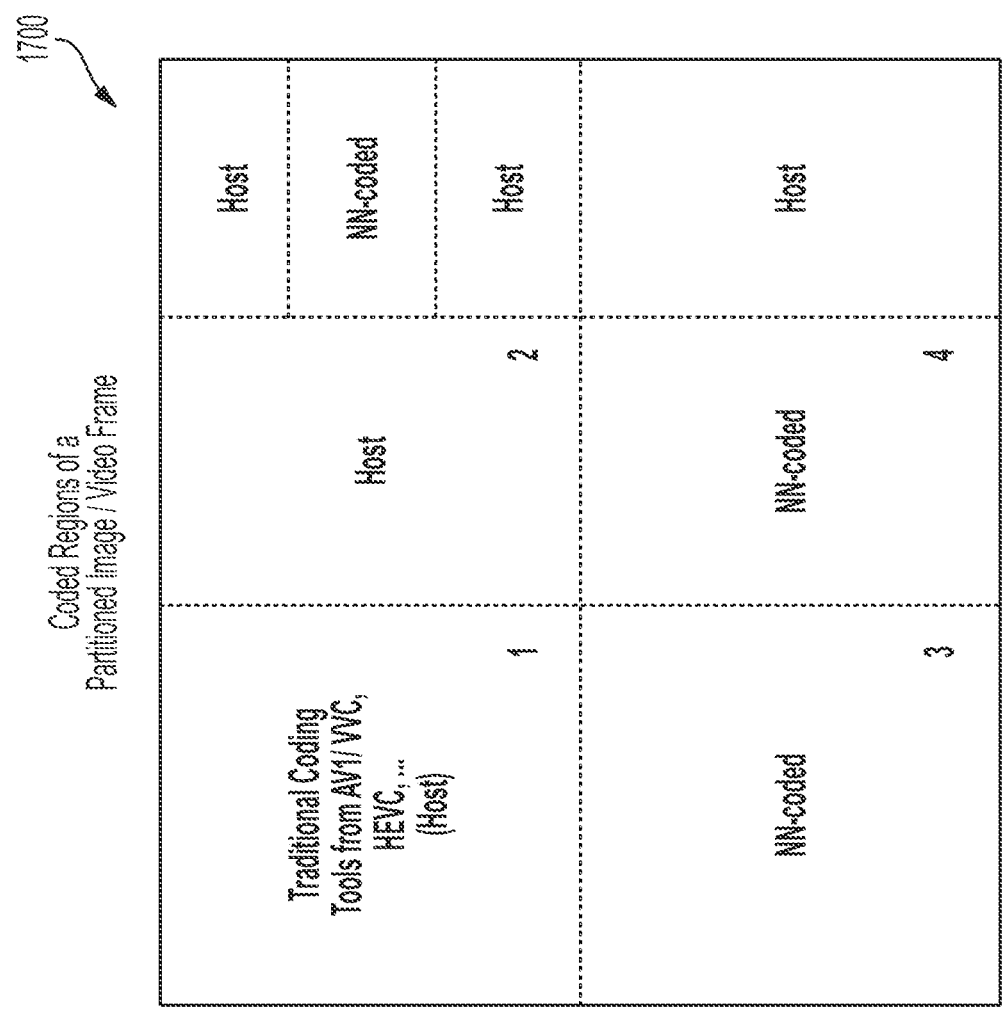
FIG. 17 depicts an example partitioning.

In a particular embodiment, an image or video/frame can be split into regions, e.g., tiles or slices, or coding blocks as in FIG. 17. Each coding block can be encoded with either the host codec, as shown with "Host" regions, or the NN-based compression approach (e.g., NN-coded regions). A low-level coding block, super-block level flag or other indices as explained above, can be signaled to the decoder to let it know which regions may be decoded and/or reconstructed using the host codec's coding tools or the NN-based compression system. The decoder can decode this low-level flag to switch the decoding and reconstruction process from the host codec to the NN-based approach. This flag can be signaled for each coding block individually or one such flag can be signaled for a subset of coding units. Several examples are as follows:

In one embodiment, nn_compress_flag can be signaled separately for each coding block.

In one embodiment, nn_compress_flag can be signaled at the first coding block of a given super-block or CTU.

In one embodiment, nn_compress_flag can be signaled at the first coding block of a given super-block or CTU and other coding blocks residing inside the same CTU/super-block can reuse or infer the nn_compress_flag depending on the nn_compress_flag value for the first coding unit/block.

In one embodiment, nn_compress_flag can be signaled only for a subset of coding blocks and can be inferred for other coding blocks within the same frame or super-block.

Figure 18:
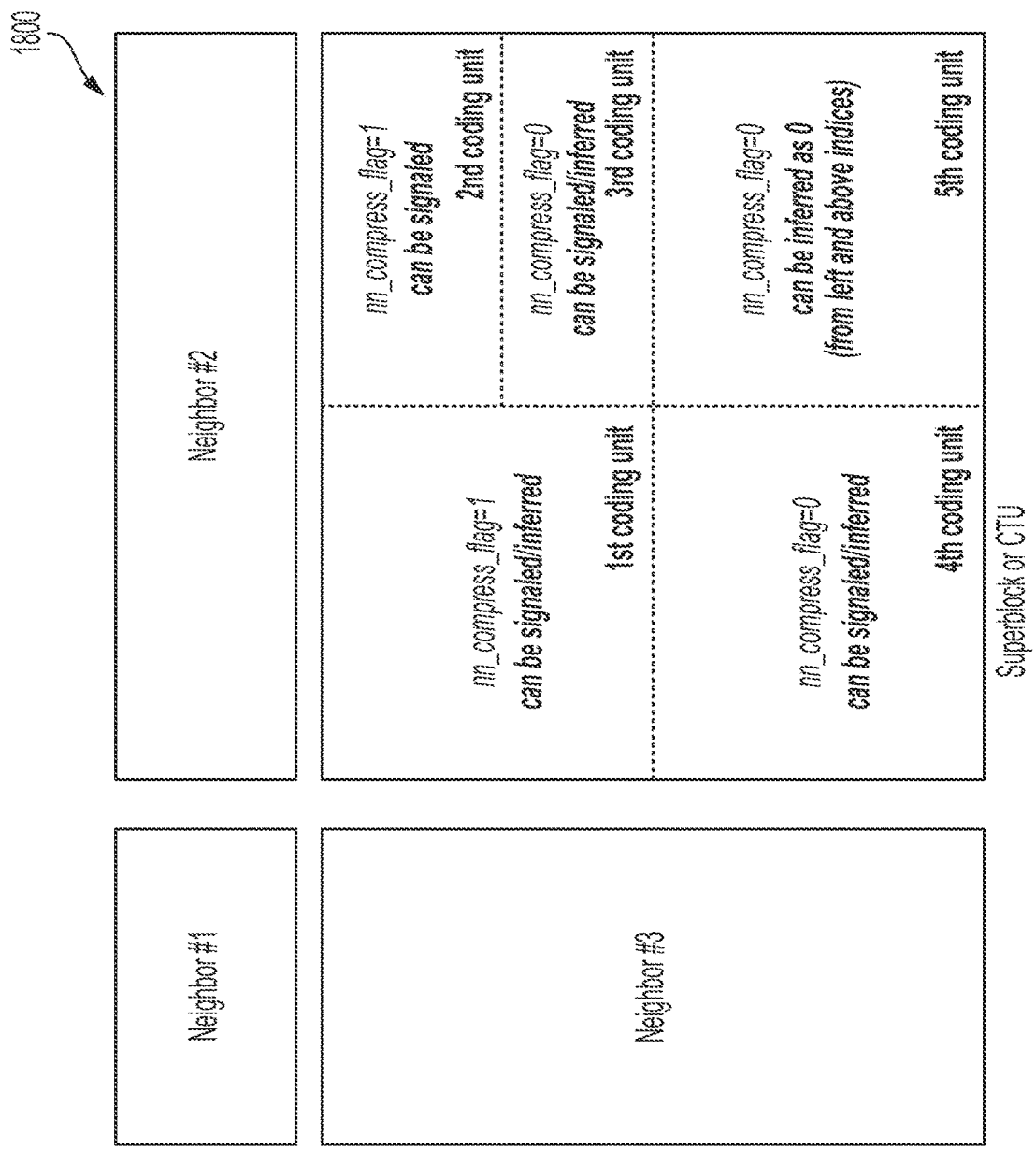
FIG. 18 depicts an example partitioning.

In one embodiment, a super-block/CTU is shown at the bottom right of in FIG. 18 which is split into 5 coding units by the host codec. This super-block has 3 neighboring blocks (marked with Neighbor #s). In this example, nn_compress_flag can be inferred from the other nn_compress_flag values from the neighbors #1, #2, and #3 such that it is not necessary to signal this information for the bottom right super block.

In one embodiment, nn_compress_flag for the 2nd coding unit in FIG. 18 can be signaled directly without inference or reliance on the neighbors.

In one embodiment, the 5th coding unit in FIG. 18 can infer the value of this low-level nn_compress_flag as κ since the left coding unit (4th) and above coding unit (3rd) have flag values equal to 0. In other words, encoding/decoding process of nn_compress_flag can depend on the neighboring coding blocks indices rather than only signaling the component. The same applies to inferring this flag as 1. This example can be generalized to arbitrary neighborhoods of a current block.

In one embodiment, nn_compress_flag can be signaled and/or inferred jointly for luma and chroma components.

In one embodiment, nn_compress_flag can be signaled for the luma and chroma components separately, in, for example, a separate partitioning tree case.

In one embodiment, nn_compress_flag can be signaled for the luma blocks, and the chroma blocks can reuse the value of this signaled luma flag.

In one embodiment, the examples above can be combined to perform various types of signaling and inference approaches in encoding and decoding nn_compress_flag.

In one embodiment, a skip mode flag can be signaled to the decoder to indicate that certain host codec operations may be skipped such as the transform. In this case, the NN model can implicitly be turned on to perform certain operations without needing explicitly to signal NN related modes and flags.

3.3 Entropy Coding of Hybrid Control

In one example, the entropy coding process for nn_compress_flag can be context-coded when using binary or multi-symbol arithmetic coding. A separate probability model can be used for coding the nn_compress_flag during the entropy coding process inside the host codec. This probability model can depend on the neighboring blocks information and flags/indices and or other high or low-level flags from the current coding block or neighboring blocks.

For instance, a separate probability context can be defined for different block sizes (e.g. different contexts for 64×64 versus 256×256). For each different block size or a subset of different block size groups a different context can be selected. This makes signaling the nn_compress_flag more efficient. In a similar case, if the block size is larger than 128×128 a separate context can be used.

In another example, probability contexts can be selected based on a subset of flags from each coding tool in the current block and/or neighboring blocks. As an example, if the neighboring blocks (e.g., left and above) use a DCT-2 type of transform, then a separate context can be used when encoding the nn_compress_flag for the current block.

In another example, probability contexts can be selected based on the partition type, partitioning tree and or other partitioning related information from the current and/or neighboring blocks. For example, if partitioning type for the current super block is horizontal, different contexts can be used to encode nn_compress_flag.

In one case, probability contexts can be selected based on component type such that when encoding nn_compress_flag, an arithmetic encoder/decoder can use separate probability models for the luma and chroma components.

In another case, probability contexts can be selected depending on the value of nn_compress_flag in the neighboring blocks. For example, if the left and above blocks have flag values of 1 and 0, a separate context can be used as compared to the case if both flag values were 1.

In one embodiment, a high-level flag (nn_compress_enable) can be signaled at the frame level, picture level, sequence header etc. This signaling can happen in addition to the block level nn_compress_flag. If the high-level flag is 0 (disabled) then all coding blocks of the image/frame can be forced to use the host codec's operations and the signaling of the low-level flag is not necessary since it can always be inferred as nn_compress_flag=0 at the decoder.

3.4 Rate Control of a Hybrid Codec

In one embodiment, a NN-based system can be multi-rate and can compress an image or video based on a bitrate "level" or bitrate target. The level value may be similar to the Qp value in conventional codecs and controls the quantization/distortion performance of the end-to-end NN-system. In one example, a higher-level value will allocate more bits when encoding a present image/frame/coding block and cause less distortion. Alternatively, a lower-level value will cause the NN-based system to compress an image/frame or a block more aggressively. The level value can be an additional input to the NN-based system at the encoder/decoder.

In one embodiment the level value can be decided by the encoder and signaled in the bitstream explicitly. This signaling would be in addition to the signaled Qp value by the host codec.

In an embodiment, the Qp value of the host codec can be used to find a mapping for the level value of the NN-based system. This means that the Qp value can be signaled with the host codec and the decoder can decode the Qp value to find a corresponding level value for the NN-based system to proceed with decompression. This mapping can be achieved by means of storing values in a mapping table, such that given a Qp value the table would return a corresponding level value (e.g., Level_Map=Table[Qp]). Alternatively, the mapping can be based on a simple mathematical relationship such as Level_Map=−2.7*(Qp>>2). This mapping avoids signaling a separate level value for bitrate savings.

In a particular embodiment, a mapping and signaling scheme can be combined together. For example, an initial mapping can map a Qp value to a corresponding level value and additionally a delta-Level value can be signaled to the decoder. This delta-Level value can be determined by a complex encoder to find an optimal level value for the specific image block or frame. The final level value in this case would be Level_Final=Level_Map+delta-Level.

In one embodiment the level value or the delta-Level can be coded with the host-codec's arithmetic encoder with relevant probability contexts. These contexts can depend on block-size, value of level values of the neighboring blocks, etc.

In one embodiment, the level value mapping (either table values or functions) can be defined separately based on the internal-bit-depth of the input image or video codec and or/bit depth of the input sequence. For example, 10-bit content could have a separate mapping or function as compared to 8-bit content.

3.5 Hybrid Control for Luma/Chroma

In a particular embodiment, separate NN-based compression systems can be used per Y, Cb, Cr channels or for a subset of those channels. In an embodiment, the luma blocks can use a single NN compression model and a block level flag nn_compress_flag_luma can be signaled for a luma block separately. A different NN compression process can be used for chroma blocks, for which another low-level flag nn_compress_flag_cbcr can be signaled. The signaling embodiments detailed above for nn_compress_flag can be used for nn_compress_flag_luma and nn_compress_flag_cbcr flags.

In another embodiment, luma and chroma blocks can have separate partitioning trees and can use the same or different NN architectures for compression and decompression stages. In one example, the value of nn_compress_flag_cbcr flag can be inferred directly from the value of the nn_compress_flag_luma to avoid redundant signaling. That is luma can use a "model 1" NN architecture if nn_compress_flag_luma is signaled as 1, and chroma channels can use a separate "model 2" NN architecture (that may be simpler than model 1) dependent on nn_compress_flag_luma flag and compress and decompress chroma channels accordingly with the model 2 NN architecture. In this case nn_compress_flag_cbcr can be inferred as 1 if nn_compress_flag_luma=1. In another example, nn_compress_flag_cbcr can be inferred from nn_compress_flag_luma and both luma and chroma channels can reuse the same NN-based architecture.

3.6 Loop Filtering with Neural Network and Hybrid Codecs

In one embodiment, parts of the reconstruction process from the host codec can be borrowed and applied on the reconstructions obtained from the NN-based decompression scheme. These include existing deblocking and loop enhancement filters applied on top of the NN decompressed images. This is illustrated in FIG. 8. These enhancement filters and deblocking operations can be enabled or disabled without the need for explicit signaling based on the high level (nn_compress_enabled) or low level (nn_compress_flag) signaling per restoration/loop-filtering unit. These enhancement operations can be enabled for the NN compressed image regions by explicit signaling.

In one embodiment, restoration filter flags, in-loop filter modes/flags and their strengths, or filter modes such as CDEF in AV1 or adaptive loop filter (ALF) flags can be signaled depending on the nn_compress_flag. For instance, CDEF can be turned off and CDEF signaling can be inferred as 0 if nn_compress_flag=1.

In another embodiment, restoration filter strengths can be set to a predefined value (e.g., 0) if nn_compress_flag=1 to avoid signaling them unnecessarily.

In one embodiment, all restoration filters and in-loop filters can be inferred at the decoder to be disallowed (with relevant flags/modes/indices inferred as 0) if nn_compress_flag=1.

In one embodiment, adaptive loop filtering (ALF) in VVC can be disabled for the present CTU if nn_compress_flag=1 for an individual coding block inside the CTU.

3.7 Coding Parameter Restrictions Based on Hybrid Control

In an embodiment, based on the value of the nn_compress_flag signaling of some or all other flags in the host codec can be constrained or inferred. As an example, if a coding block decides to use the NN-based compression scheme and nn_compress_flag=1, then host codec's existing prediction/transform/quantization steps can be bypassed, and it is no longer necessary to signal of the prediction/transform/quantization related information in the bitstream. The decoder can infer all such host codec flags to be 0 depending on the nn_compress_flag.

In one embodiment, the NN-based system can work only for certain block sizes and nn_compress_flag can be signaled accordingly. For example, the NN-based system can be disabled for block sizes less that 32×32 and nn_compress_flag can be inferred as 0 at the decoder. In this case block sizes needs to be decoded prior to nn_compress_flag.

In another embodiment, nn_compress_flag can be signaled before signaling the block size and the block size can be inferred to be a specific size, e.g., 128×128 if nn_compress_flag=1.

In one embodiment, nn_compress_flag can be signaled for certain partition types. For example, nn_compress_flag can be signaled only when the partition type is None, or a 4-way split. For other cases it can be inferred as 0 at the decoder end. In this case, the partition type needs to be decoded prior to nn_compress_flag. This would avoid signaling nn_compress_flag redundantly for all block splits.

In an alternative embodiment, nn_compress_flag=1 can be explicitly signaled, and partition type can be inferred as None based on nn_compress_flag. This would avoid signaling partition type redundantly.

In one embodiment, transform type (TX_TYPE) and transform size (TX_SIZE) can be inferred at the decoder depending on the signaling of nn_compress_flag. For example, if nn_compress_flag=1 then TX_TYPE can be inferred as DCT_DCT and TX_SIZE can be set equal to the block size or some other value. This avoids redundant signaling since nn_compress_flag=1 indicates that host codecs transform stages may be bypassed.

In one embodiment, intra prediction modes and angles can be inferred based on the value of nn_compress_flag. For example, if nn_compress_flag is signaled to the decoder as 1 then intra prediction mode can be inferred as DC_PRED and intra prediction angle can be inferred as 0 without signaling them.

In one embodiment, signaling of all transform coefficients/tokens, transform skip flags, coefficient signs, coefficient levels, position of the last significant coefficient, the value of the DC term and all other transform related information can be skipped if nn_compress_flag=1 for the individual coding blocks, frames, and images.

In one embodiment, signaling of Intra Block Copy (IBC) flags/modes/indices and Palette Mode flags/colors/indices can be skipped if nn_compress_flag=1. These tools can be inferred to be inactive with relevant underlying flags not signaled and rather inferred.

In one embodiment, tools such as multiple reference line-based prediction, matrix based intra prediction, intra sub-partitioning, sub-block transform, and low-frequency non-separable transform (LFNST) in VVC can be disabled when nn_compress_flag=1, in this case there is no need to explicitly signal the block-level signals associated with these tools and such flags can be inferred at the decoder end as 0.

3.8 Prediction of Hybrid Partitions

In one embodiment, an NN module can compress smaller blocks of a partitioned image as shown in FIGS. 6 and 7 by reusing the previously decoded samples or side information from neighboring blocks. For block #4 in FIG. 17, the NN-module can read the reconstructed samples from the blocks 1, 2 and 3 to compress block 4 more efficiently.

Figure 19:
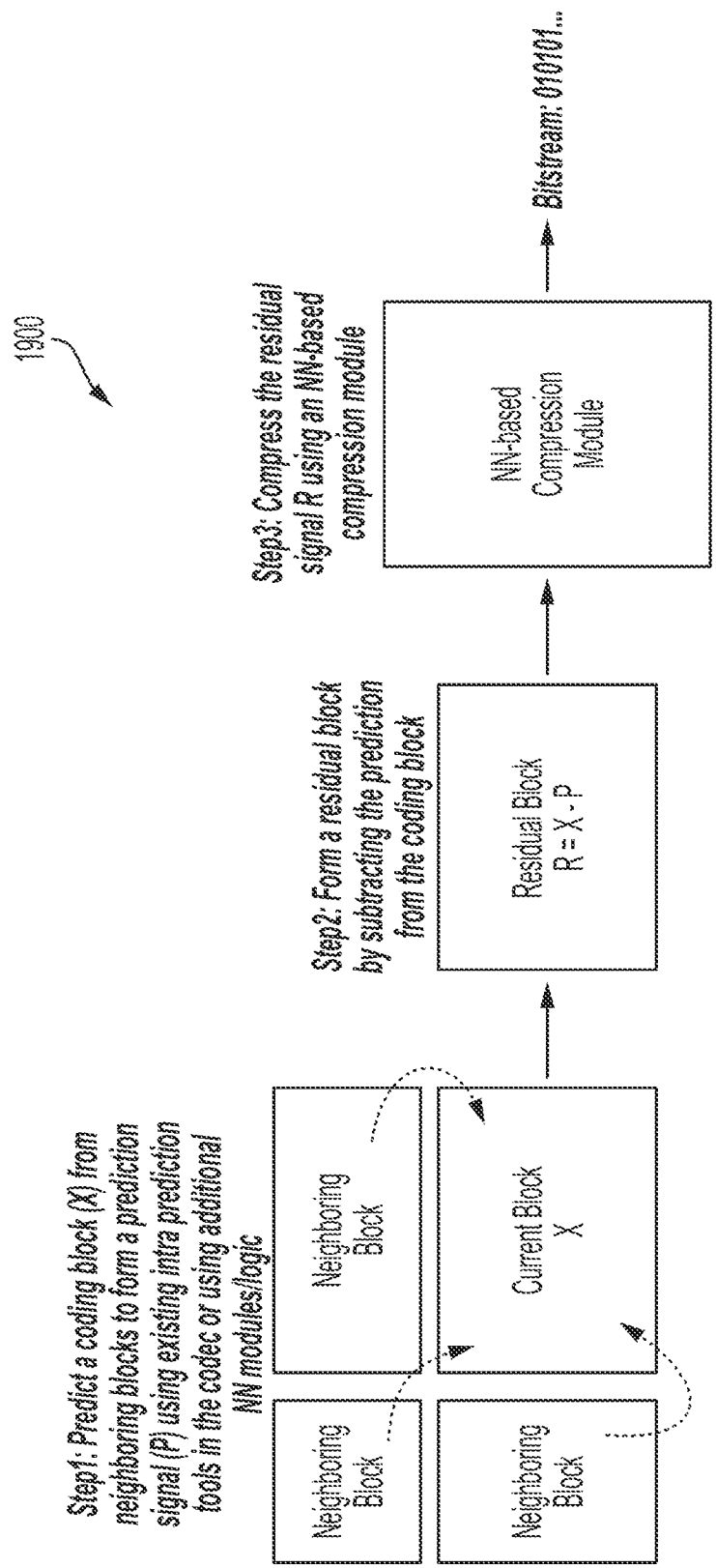
FIG. 19 depicts an example of prediction with partitioning

In an embodiment, pixel values from blocks 1, 2, 3 in FIG. 17 can be used to directly predict the contents of block 4 with the NN module prior to compressing with the same NN-module. This approach is illustrated in FIG. 19. In Step 1, a coding block (X) can be predicted from the samples of the neighboring coding blocks to form a prediction signal P. This prediction can be achieved by using the 1) the traditional prediction tools of the host codec, 2) using additional NN layers cascaded to the NN-based compression scheme, 3) or a combination of the existing prediction tools and an NN-based logic. In Step 2, a residual block can be formed by subtracting the prediction signal P from the original pixel values of the current block X to form a residual signal/block R. The NN-based compression scheme detailed in FIGS. 6 and 7 can then compress the remaining residual signal (R) in an end-to-end fashion in Step 3 to generate a bitstream. This can significantly reduce the redundancy in the current block by using the samples in neighboring blocks.

In one embodiment, the bitstream in previous embodiments can be generated by either using the host-codec's entropy coding process, or by using the entropy coding process shown in FIG. 8 by using a hyper prior-based arithmetic encoding (AE) process.

In a particular embodiment, the prediction stage detailed in the previous embodiments can involve other side information such as the mean values, variance and other statistics present in the neighboring blocks and not just the pixel values.

In one embodiment, this alternative prediction approach to NN-based residual compression system can be integrated to a host codec as detailed in this invention and can use all low-level (nn_compress_flag) and high-level flags (e.g., nn_compress_enable) as described previously.

3.9 Separate Encoding for Average (DC) Pixel Values

Figure 20:
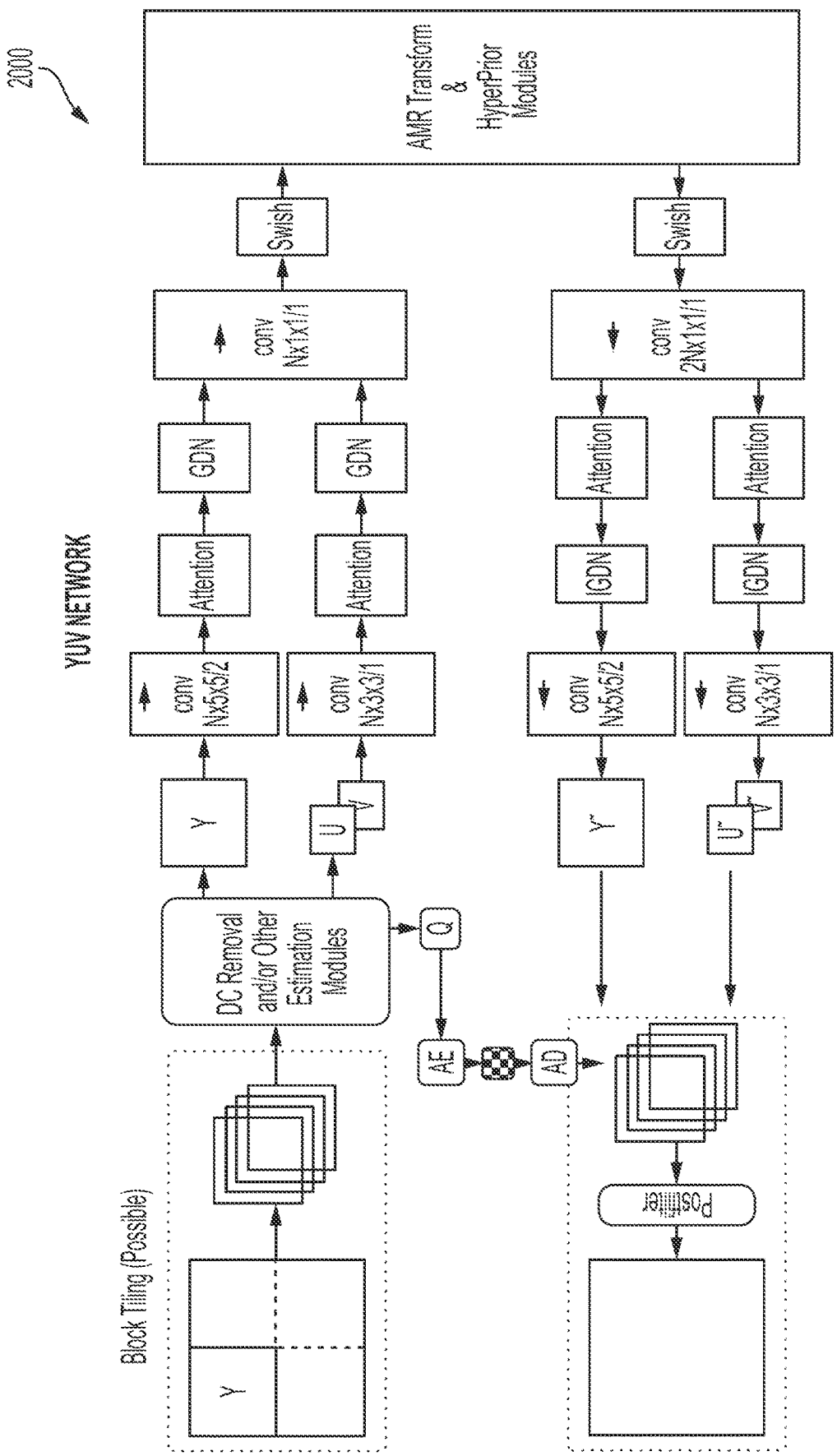
FIG. 20 depicts an example neural network encoder and decoder with separate processing for a DC component.

In a particular embodiment, a video encoding system can tile/partition the image into separate coding blocks, and each block can be encoded with the NN-based system after removing the DC terms and other low-dimensional information prior to compression. This is illustrated in FIG. 20, where a video frame is tiled into 4 coding blocks; for each block the DC term is removed and the resulting pre-processed may be compressed in an end-to-end manner with the NN-based compression system. In one embodiment, the DC term and other low-dimensional information can be encoded with an arithmetic encoder and can use probability contexts per component. In another embodiment, after reconstructing the individual coding blocks with the NN-based system and adding back the DC term, a post-filter can be used as a deblocking and enhancement filter to improve the subjective quality of the final image this is shown in the bottom left part of FIG. 20.

3.10 Multi-frame Hybrid Coding

In a different embodiment, the NN-based compression system can encode an entire group of pictures (GOP) by performing necessary motion estimation/compensation and inter-prediction processes. This is depicted in FIG. 21. The NN system can handle the inter-prediction/motion estimation/compensation processes and also compression/decompression process to compress an entire GOP by using the NN video compression system or alternatively using the host video codec.

In one embodiment, a host codec can use the NN-based system to estimate motion instead of using its existing motion estimation tools. Then perform inter-prediction using its existing tools or the NN-based inter-prediction tools.

In another embodiment, a host codec can encode an I-frame using the mechanisms described in FIG. 15A/B (can encode an entire frame) and FIG. 16A/B (can encode smaller coding blocks) with either the host codec or the NN-based approach; and the consecutive P-frames (e.g., Frame #2 in FIG. 21) by using either an NN-based P-frame coder or the host codec.

3.11 Hybrid Encoder Simplification

Selection of an encoder (e.g., between a host codec tool and a neural network alternative) may be simplified with a variety of techniques in order to reduce encoder complexity. In a one embodiment, selection of an encoder (or encoder tool) may be based on statistics of a frame or partition to be encoded. For example, when block statistics are too "simple," such as with screen content, a neural network encoder may be disabled by default.

In an embodiment, a pre-analysis done on either the frame level data or block level information can yield a statistic which may include (variance, mean, etc.) for which NN model can be disabled by the encoder based on decision rules on the statistics.

In an embodiment, an encoder decision (based on statistics either at frame/block level) can also be signaled to the decoder at either at the sequence/slice or frame level for which case NN mode can be turned off by the encoder.

In an embodiment, when the RD cost of host codec tools is already below a certain threshold, then NN encoding may be skipped a host encoder may be sufficient, for example, for intra or inter coding.

In an embodiment, a RD search may be disabled (for some partitions, transform types such as IDTX, etc.) if the NN model provides an RD that is very hard to beat.

In an embodiment, machine learning techniques may be used to decide whether to skip NN mode search or a host codec mode search. The machine learning model can either be pre-trained or be unsupervised.

In an embodiment, a NN model can be partially executed as one-shot (only transform/quantization/inverse transform parts) either at the frame level or super-block level to establish a baseline MSE value during an RD search. Based on this MSE value and/or the quantized codewords, NN mode search can be turned off for smaller partitions.

Figure 22:
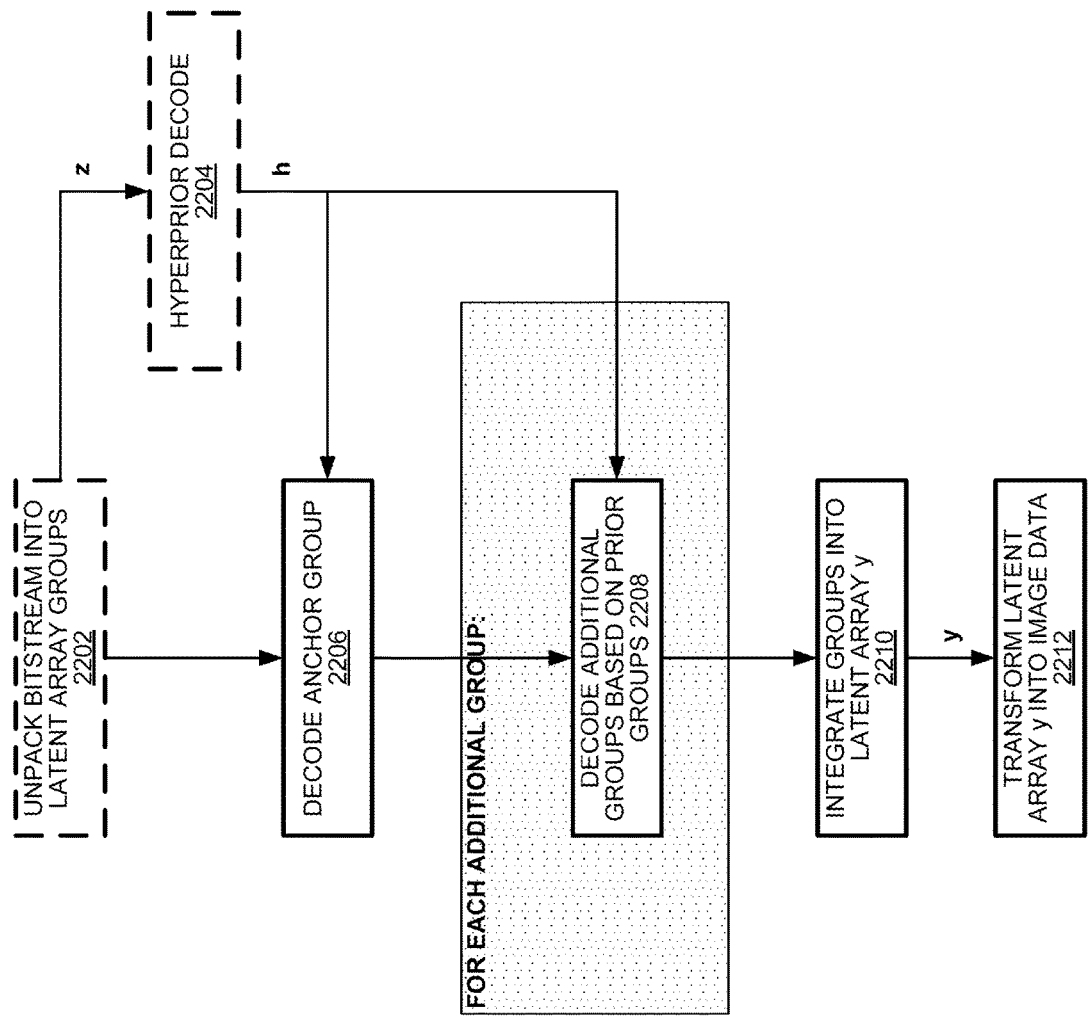
FIG. 22 depicts an example neural network decoding method with multi-stage decoding.

FIG. 22 depicts an example neural network decoding method 2200 with multi-stage decoding. In an aspect, neural network decoding method 2200 may be a counterpart method to the neural network encoding method 600 of FIG. 6. Method 600 may be implemented, for example, with the decoders of FIG. 3, 15B or 16B. In neural network decoding method 2200, an anchor group portion of a latent array y may be decoded (2206) without respect to other groups of the latent array, and then additional stages of decoding may decode any additional groups based on the decoding of the prior-decoded groups (2208). The decoded groups may be integrated into latent array y (2210), and the latent array y may be transformed by a neural network into image data (2212). Additional aspects of multi-stage neural network decoding including decoding of a latent array y and hyperprior side information z are described above in Section 2.2 for "Multi-stage Prediction with Neural Networks."

In optional aspects of method 2200, an encoded bitstream may be unpacked (2202) into encoded groups of the latent array y along with hyperprior side information z. The hyperprior side information z may be decoded (2204), and the decoding of groups (2206, 2208) may be based on the decoded hyperprior side information h.

FIG. 23 depicts an example neural network decoding method 2300 with separate luma/chroma processing. In an aspect, neural network decoding method 2300 may be a counterpart method to the neural network encoding method 700 of FIG. 7. In decoding method 2300, luma and chroma data for a portion of source image data may be process separately after decompressing with an inverse transform neural network (2304). The separate processing may include processing the luma data for the portion by a luma attention processor (2308) and then by a luma convolutional network (2316), while the chroma data may be processed by a chroma attention processor (2310) and then by a chroma convolutional network (2318).

In an aspect the luma convolutional neural network and the chroma neural network may be separate neural networks in that weights upon which they are based are separate and trained separately. In another aspect, the luma and chroma attention processors are separate in that weights upon which they are based are separate and trained separately.

In optional aspects, the attention processors may include processing the attention processor input with both a truck branch processing (2330, 2340) and a mask branch processing (2332, 2342). An attention integration (2334, 2344) may combine the outputs of the trunk branch and mask branch along with the input to the attention processor to produce the attention processor output. Trunk branch (TB) processing may consist of residual convolutional neural network layers which may allow specific information to pass directly for further processing. For example, given an input x to the attention processor, the output of the trunk branch may be y1=x+TB(x). Mask branch (MB) processing may consist of residual neural network layers along to produce element-wise masks. For example, given an input x to the attention processor, the output of the mask branch may be y2=MB(x). Attention integration (2334, 2344) may include masking the trunk branch with the element-wise masks. For example, attention processing output may be y1*y2+x.

In an aspect, separate inverse generalized divisive normalization (IGDN) processors for luma and chroma may be applied respectively to the outputs of the luma attention processing (optional box 2312) the chroma attention processing (optional box 2314). In yet another aspect, a decoding hyperprior neural network (optional box 2302) may produce hyperprior side information h, such as in FIG. 8. Additional aspects separate luma and chroma processing are described below in Section 2.1 for "Attention Processor with Neural Networks," such as regarding FIG. 9A.

The foregoing discussion has described operation of the aspects of the present disclosure in the context of video coders and decoders, such as those depicted in FIGS. 2, 3, 8, 11, etc. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically include instructions stored in non-transitory physical storage media such as electronic, magnetic, and/or optically based storage devices, where they are read by a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the present invention are specifically illustrated and described herein. However, it will be appreciated that modifications and variations of the present invention are covered by the above teachings and within the purview of the appended claims without departing from the spirit and intended scope of the invention. For example, much of the foregoing description has characterized various embodiments of the invention as embodied in hardware circuits. In many applications, however, the foregoing embodiments actually may be embodied by program instructions of a software application that executes on a processor structure such as a microprocessor or a digital signal processor. Thus, the foregoing description should be interpreted as applying equally to application specific electronic circuits or to program instructions executing on general processing structures.

We claim:

1. An image encoding method, comprising:
    selecting an encoder for a portion of image data from either a first encoder or a neural network encoder based on a rate-distortion analysis;
    when the neural network encoder is selected, encoding the portion with the neural network encoder into a neural network encoded bitstream;
    when the first encoder is selected, encoding the portion with the first encoder into a first encoded bitstream, and including data of the encoded portion along with encoded data of other portion(s) of the image data in an output bitstream.

2. The encoding method of claim 1, wherein the portion is a frame.

3. The encoding method of claim 1, wherein the portion is a pixel block.

4. The encoding method of claim 1, wherein the portion is a color component.

5. The encoding method of claim 1, further comprising:
selecting a spatial partitioning of a frame;
wherein the portions are determined based on the spatial partitioning of the frame; and
an indication of the partitioning is included in the output bitstream.

6. The encoding method of claim 1, further comprising:
determining whether the encoder selection matches a default selection technique;
when the encoder selection does not match the default selection, including data in the output bitstream identifying the encoder selection.

7. The encoding method of claim 1, wherein:
determining whether the encoder selection matches a default selection technique;
when the encoder selection does match the default selection for a particular portion of image data, the default selection is implied in the output bitstream without explicitly signaling the default selection for particular portion.

8. The encoding method of claim 1, wherein:
the selection of an encoder for a portion of the image data is signaled in the output bitstream jointly for luma and chroma components of the portion.

9. The encoding method of claim 1, wherein:
the encoding of the first encoder bitstream is done independently of the network encoder bitstream, and
the encoding of the network encoder bitstream is done independently of the first encoder bitstream.

10. The encoding method of claim 1, wherein:
the encoding of the first encoder bitstream depends on the network encoder bitstream, and
the encoding of the network encoder bitstream depends on the first encoder bitstream.

11. The encoding method of claim 1, wherein:
the first encoder encodes the portion based on first encoding parameters for the portion; and
the first encoding parameters are constrained based on the encoder selection for the portion.

12. The encoding method of claim 1, wherein:
when the selected encoder for a portion is the neural network encoder, first encoding parameters for the first encoder for the portion are implied by the encoder selection for the portion and are not explicitly signaled for the portion in the output bitstream.

13. The encoding method of claim 1, further comprising:
selecting a spatial partitioning of a frame;
wherein the portions are determined based on the spatial partitioning of the frame, and the selection of an encoder for a portion is based on a partition size of that portion.

14. The encoding method of claim 1, further comprising:
selecting a spatial partitioning of a frame;
wherein the portions are determined based on the spatial partitioning of the frame, and coding parameters for encoding a portion with its corresponding selected encoder are based on the size of the partition size of the portion.

15. The encoding method of claim 1, further comprising:
selecting a spatial partitioning of a frame;
wherein the portions are determined based on the spatial partitioning of the frame, and coding parameters for encoding a portion with its corresponding selected encoder are based on the size of the partition size of the portion.

16. The encoding method of claim 1, wherein:
encoder selections for corresponding portions of the image data are entropy coded with a probability model; and
the output bitstream includes the entropy coded encoder selections.

17. The encoding method of claim 16, wherein:
the probability model for entropy coding an encoder selection for a current portion of the image data is based on an encoder selection for a prior portion of the image data that spatially neighbors the current portion.

18. The encoding method of claim 16, wherein:
the probability model for entropy coding an encoder selection for a current portion of the image data is based on encoding parameters for a prior portion of the image data that spatially neighbors the current portion.

19. The encoding method of claim 16, wherein:
the probability model for entropy coding an encoder selection for a current portion of the image data is based whether the current portion includes luma or chroma image data.

20. The encoding method of claim 16, wherein:
the probability model for entropy coding an encoder selection for a current portion of the image data is based on encoding parameters of the current portion.

21. The encoding method of claim 16, wherein:
a current portion of the image data is a spatial partition of a frame; and
the probability model for entropy coding an encoder selection for the current portion is based on a size of the spatial partition.

22. The encoding method of claim 16, wherein:
a frame of image data is spatially partitioned into superblocks of a spatially neighboring plurality of partitions;
the probability model for entropy coding encoder selections for partitions in the superblock is based on a type of superblock.

23. An image encoding system, comprising:
a first encoder including one or more first codec tools for encoding first portions of image data into a first encoded bitstream;
a neural network encoder for encoding second portions the image data into a neural network encoded bitstream;
a controller for selecting an encoder from either the first encoder or the neural network encoder for portions of the image data based on rate-distortion analysis;
a bitstream packer for combining the bitstream output by the selected encoder for each portion of the image data into an output bitstream.

24. An image decoding method, comprising:
identifying, from encoded video data, selections of an encoder for corresponding portions of image data;
parsing the encoded video data into a first bitstream and a neural network bitstream based on the selections;
when a first encoder is selected, decoding the portion with the first encoder into a first encoded bitstream into decoded first portions;
when a neural network decoder is selected, decoding the corresponding portion with the neural network decoder into decoded neural network portions; and
combining the decoded first portions and decoded neural network portions into reconstructed video data.

25. The decoding method of claim 24, further comprising:
identifying, from the encoded video data, a spatial partitioning of the image data, wherein the portions are based on the partitioning;

entropy decoding the selections of an encoder from the encoded video, the entropy decoding of a first selection of encoder for a corresponding first partition of image data is based on a probably model that depends on a second partition spatially neighboring the first partition.

26. An image coding method, comprising:
encoding first partitions of image data by a first encoder technique and according to coding parameters determined from a first rate control parameter;
encoding second partitions of the image data by a neural network encoder according to coding parameters determined from a neural network rate control parameter;
merging encoded data of the first partitions and encoded data of the second partitions into a combined bitstream.

27. The coding method of claim 26, further comprising:
determining the neural network rate control based on a first quantization parameter (Qp) of the first encoder;
wherein the first quantization parameter is signaled in the combined bitstream, and the neural network rate control parameter may be inferred from the signaled first quantization parameter.

28. The coding method of claim 26, further comprising:
determining a neural network rate control delta from the first rate control parameter and the neural network rate control parameter;
wherein the first rate control parameter and the neural network rate control delta is signaled in the combined bitstream.

29. The coding method of claim 26, further comprising:
determining the neural network rate control based on a first rate control parameter and a bit depth of source image data.

30. The coding method of claim 26, further comprising:
entropy coding neural network rate control parameter selections for corresponding partitions of image data based a probability context for the corresponding partitions, wherein the probability context includes a size of the corresponding partition.

31. The coding method of claim 26, further comprising:
entropy coding neural network rate control parameter selections for corresponding partitions of image data based a probability context for the corresponding partitions, wherein the probability context includes rate control parameter(s) for a neighboring partition(s).

* * * * *